US008858793B2

(12) United States Patent
Roesgen

(10) Patent No.: US 8,858,793 B2
(45) Date of Patent: Oct. 14, 2014

(54) FILTER, FILTER ELEMENT, FASTENING HOUSING PART OF A FILTER HOUSING AND TELESCOPIC SWITCHING ELEMENT OF A SWITCHING DEVICE OF A RELEASABLE DETENT CONNECTION

(71) Applicant: Mann+Hummel GmbH, Ludwigsburg (DE)

(72) Inventor: Andre Roesgen, Remshalden (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/680,077

(22) Filed: Nov. 18, 2012

(65) Prior Publication Data

US 2013/0075319 A1   Mar. 28, 2013

Related U.S. Application Data

(63) Continuation of application No. PCT/EP2011/057908, filed on May 17, 2011.

(30) Foreign Application Priority Data

May 17, 2010  (DE) ...................... 10 2010 020 727.6

(51) Int. Cl.
*B01D 35/30*  (2006.01)
*B01D 29/96*  (2006.01)
(Continued)

(52) U.S. Cl.
CPC ........ *B01D 35/30* (2013.01); *B01D 2201/4046* (2013.01); *B01D 35/153* (2013.01); *B01D2201/4015* (2013.01); *B01D 29/96* (2013.01); *B01D 2201/34* (2013.01); *B01D 2201/305* (2013.01); *F16D 1/112* (2013.01);
(Continued)

(58) Field of Classification Search
CPC ............... B01D 29/96; B01D 29/0013; B01D 2201/295; B01D 2201/40; B01D 2201/4007; B01D 2201/4015; B01D 2201/4061
See application file for complete search history.

(56) References Cited

U.S. PATENT DOCUMENTS 5,045,192 A   9/1991  Terhune
6,251,273 B1 *  6/2001  Jawurek et al. ............... 210/232
(Continued)

FOREIGN PATENT DOCUMENTS

NL    2001709 C2   1/2010

OTHER PUBLICATIONS

PCT International Search Report of PCT/EP2011/057908.

*Primary Examiner* — Benjamin Kurtz
(74) *Attorney, Agent, or Firm* — James Hasselbeck

(57) ABSTRACT

A filter (18) is fastened by means of a releasable detent connection (20) in a fastening housing part (14). One detent component (32) is connected to the filter element (18) and one detent component (36) is connected to the fastening housing part (14). At least one detent means (32) of one of the detent components engages in a bayonet-like manner in a cut-out (38) in the other detent component (36). One switching component (60) of a switching device (58) is connected to the filter element (18) and one switching component (62) is connected to the fastening housing part (14). One of the switching components (60) includes at least one switching lug (76) extending radially to a rotational/plug-in axis (30) of the filter (10), and one of the switching components (62) includes a switching slot (78) for guiding the switching lug (76). The switching slot (78) guides the switching lug (76) and thereby effects a rotational movement of the filter element (18) relative to the fastening housing part (14 to move the detent means (32) out of an insertion/withdrawal region (46) into a closing region (40) of the cut-out (38), or out of a retaining region (42) into the insertion/withdrawal region (46).

12 Claims, 16 Drawing Sheets

(51) Int. Cl.
  *B01D 35/153*  (2006.01)
  *F16D 1/112*  (2006.01)
  *B01D 35/16*  (2006.01)
  *B01D 29/21*  (2006.01)
  *B01D 29/11*  (2006.01)
(52) U.S. Cl.
  CPC ........ *B01D 2201/4084* (2013.01); *B01D 35/16* (2013.01); *B01D 2201/295* (2013.01); *B01D 29/21* (2013.01); *B01D 2201/40* (2013.01); *B01D 2201/4007* (2013.01)

USPC ........... 210/232; 210/236; 210/435; 210/437; 210/440; 210/441; 210/443; 210/450; 210/454; 210/455; 210/457

(56) References Cited

U.S. PATENT DOCUMENTS

2008/0047891 A1* 2/2008 Roesgen ....................... 210/236
2012/0031828 A1* 2/2012 van Savooijen et al. ...... 210/232

* cited by examiner

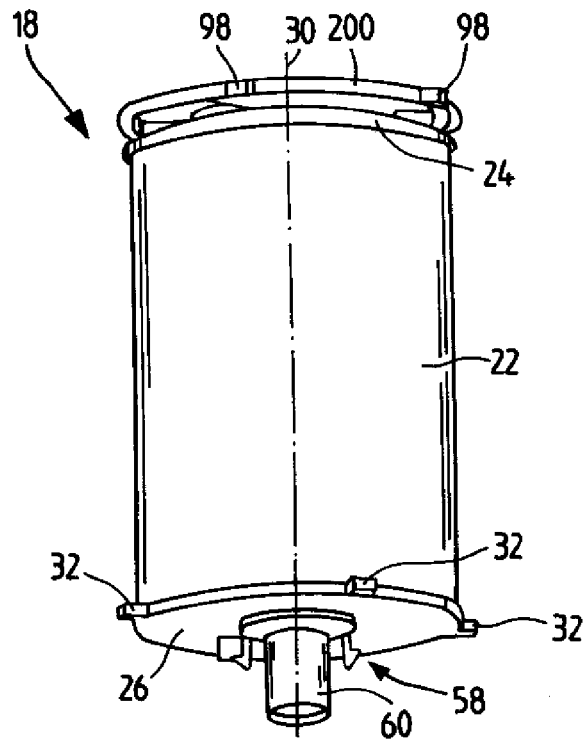
Fig.10
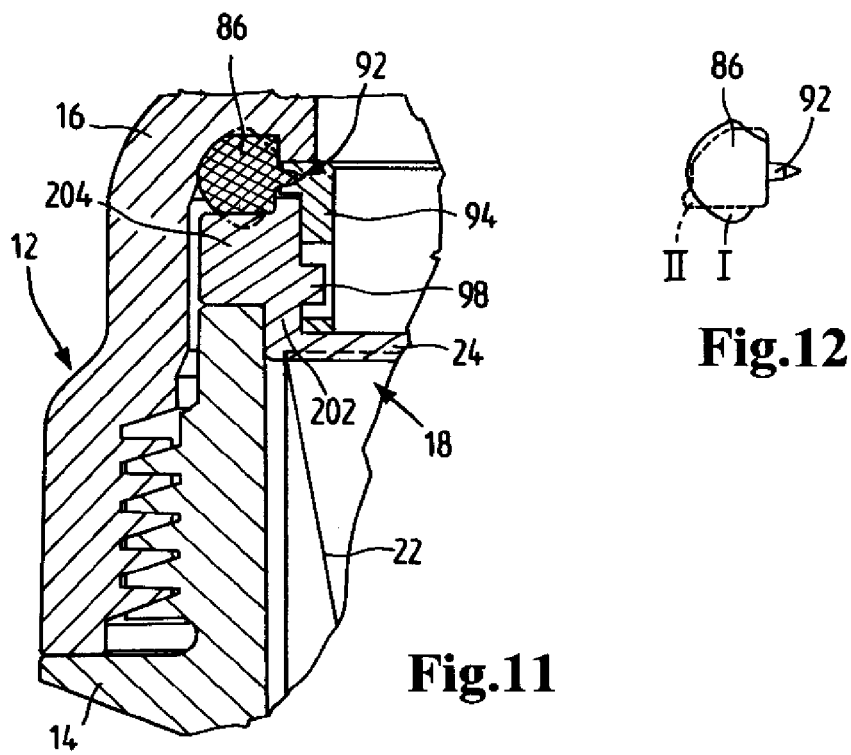
Fig.12
Fig.11

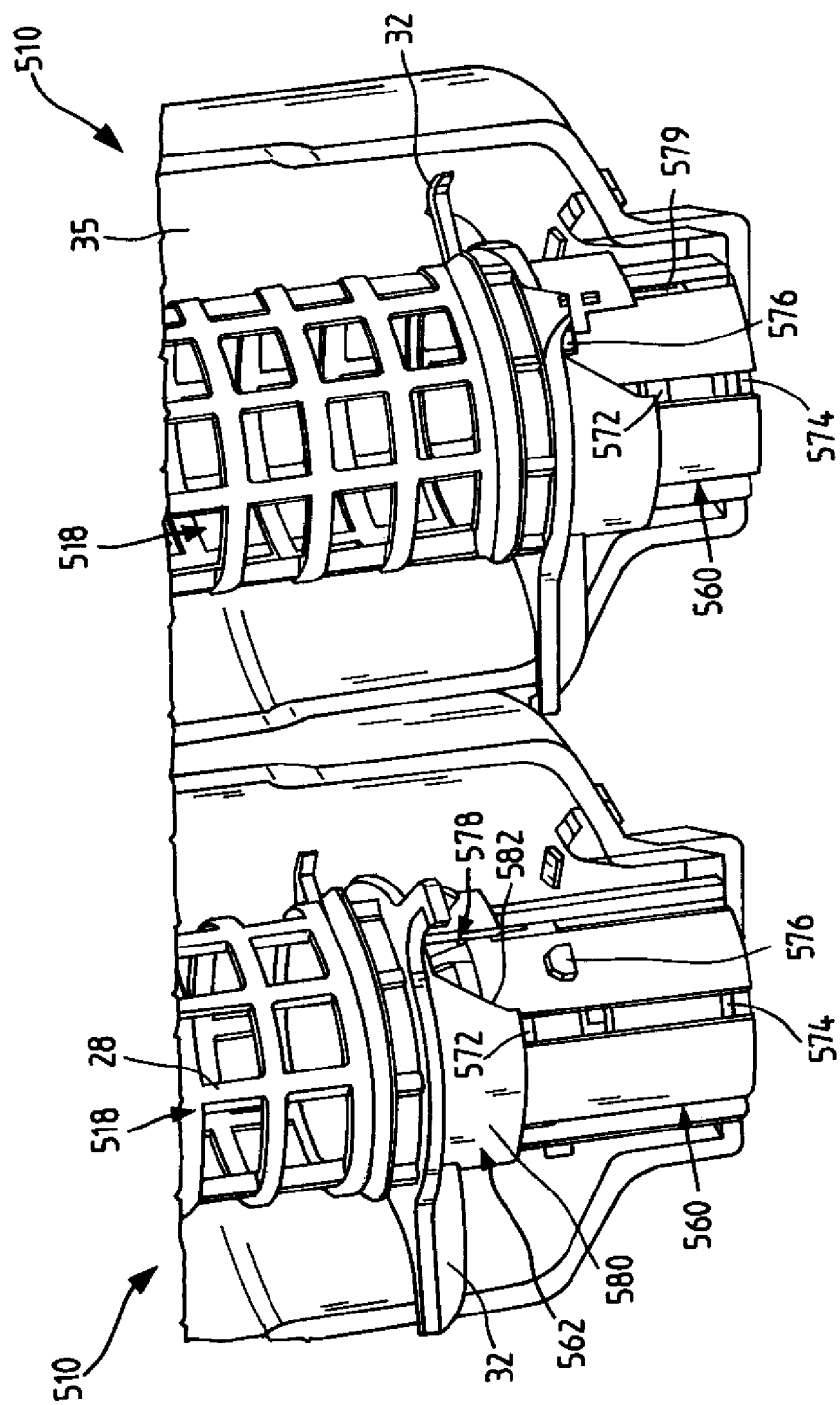

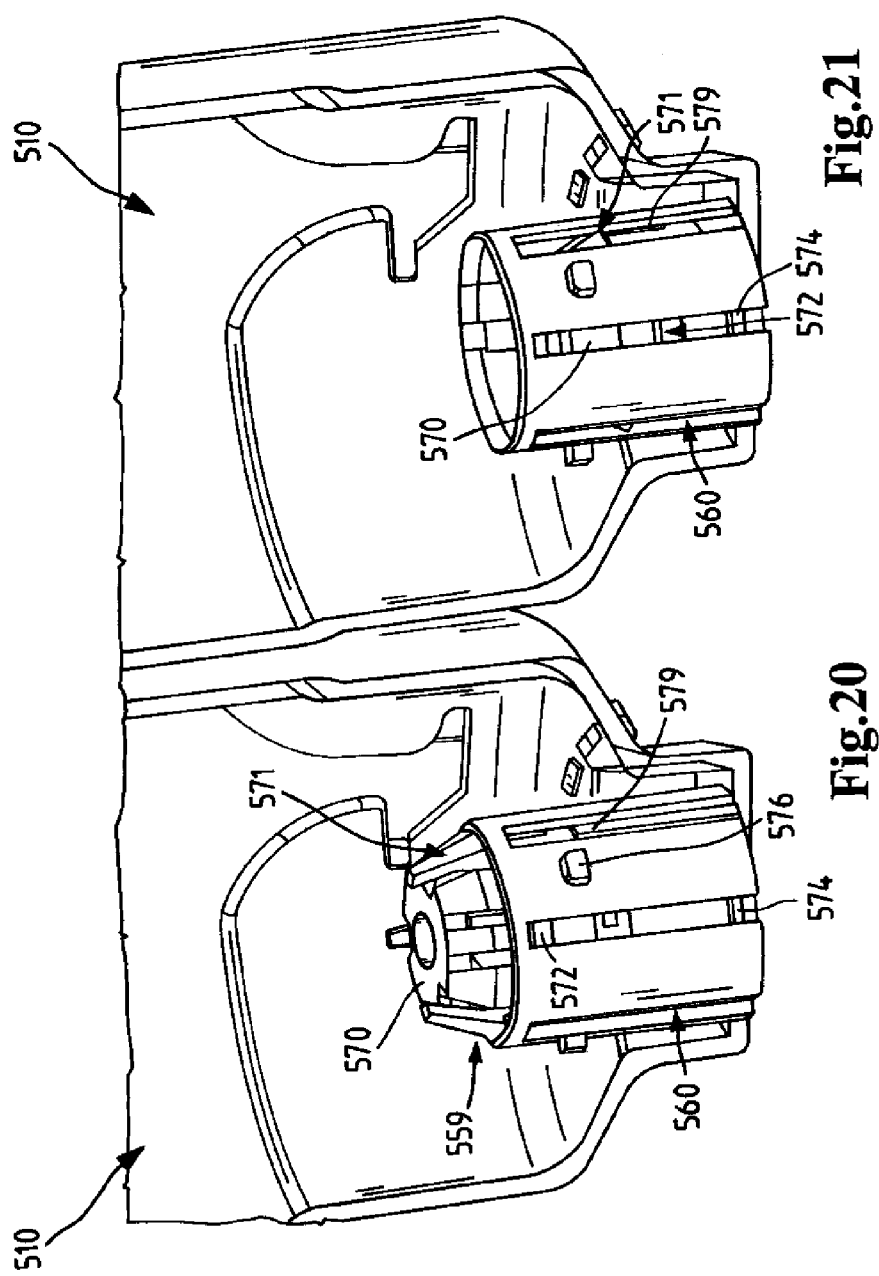

though no further measures should be required. The switching device can also be designated as a switching mechanism or control mechanism. Preferably, the switching device may be constructed in the manner of a ball point pen mechanism. Moreover, the switching device can also be employed as a switching device for further applications that require an axial relative movement of two parts to be converted into a relative rotation between the parts.

FILTER, FILTER ELEMENT, FASTENING HOUSING PART OF A FILTER HOUSING AND TELESCOPIC SWITCHING ELEMENT OF A SWITCHING DEVICE OF A RELEASABLE DETENT CONNECTION

CROSS REFERENCE TO RELATED APPLICATIONS

The present application is a US Bypass Continuation of International Application PCT/EP2011/057908 filed May 17, 2011. This application claims the benefit under 35 USC 119 of German patent application DE 10 2010 020 727.6 filed in Germany on May 17, 2010. International Application PCT/EP2011/057908 is hereby incorporated by reference in its entirety.

TECHNICAL FIELD

The invention concerns a filter for filtering fluids, in particular fuel or oil, in particular of a motor vehicle, including a housing which is comprised of at least two housing parts, and a filter element which is attached by means of a releasable detent connection in one of the housing parts and acts as a fastening housing part for the filter element, wherein the detent connection includes at least two interacting detent components, and one of the detent components is connected with the filter element and one of the detent components with the fastening housing part.

BACKGROUND OF THE INVENTION

EP 0 959 978 B1 discloses a filter which includes a housing which, in turn, is comprised of two screwed-together housing parts. For producing a reliable detent connection between filter element and a cover housing part, a recess is provided in the area of the cover housing part. This recess has different functional areas, namely a locking area, a retaining area, a translation area and an insertion/removal area which are necessary for effecting or for releasing the detent connection. Detent means of the filter element can be moved between the functional areas by relative rotations between the filter element and the cover housing part.

There remains a need in the art for a filter element, a fastening housing part, and a releasable detent connection configured in such a way that the filter element can be inserted into and removed from the filter housing in an easier and more reliable way and further, when exchanging the filter element, no fluid from the filter should reach uncontrollably the surroundings, if possible.

SUMMARY OF THE INVENTION

An object of the present invention is to provide a filter for filtering fluids, in particular fuel or oil, in particular of a motor vehicle, including a housing which is includes of at least two housing parts, and a filter element which is attached by means of a releasable detent connection in one of the housing parts and acts as a fastening housing part for the filter element, wherein the detent connection includes at least two interacting detent components, and one of the detent components is connected with the filter element and one of the detent components with the fastening housing part and at least one of the detent components includes at least one detent means and one of the detent components a recess matching the detent means, in which recess the detent means hooks in a bayonet-like manner, and wherein the recess may include at least one or more of the following limitations:

a locking area for receiving the detent means while the housing parts are connected, a retaining area for receiving the detent means during opening of the filter housing, a translation area for releasing the detent means in the recess, and an insertion/removal area for resistance-free joining and separating the detent means and the recess.

Another object of the invention is to provide a filter element of a filter which includes a detent component that is adapted to form with a detent component, which is connected with a fastening housing part of a filter housing, a releasable detent connection, wherein one of the detent components includes at least one detent means and one of the detent components a recess matching the detent means, in which recess the detent means is hooked in a bayonet-like manner.

A further object of the invention is to present a fastening housing part of a filter housing of a filter which includes a detent component, this is adapted to form with a detent component, which is connected with a filter element of the filter, a releasable detent connection, wherein at least one of the detent components includes at least one detent means and one of the detent components a recess matching the detent means, in which recess the detent means is hooked in a bayonet-like manner.

Additionally, objects of the invention concern a telescopic switching element of a switching device of a releasable detent connection for attachment of a filter element in a fastening housing part of a filter for filtering fluids, in particular fuel or oil, in particular of a motor vehicle.

The above objects are solved according to the invention in that a switching device includes at least two corresponding switching components and one of the switching components is connected with the filter element and one of the switching components with the fastening housing part, and one of the switching components includes at least one switching lug that extends radially relative to a rotation/insertion axis of the filter and one of the switching components includes a switching guide for guiding the switching lug, so that the switching guide leads the switching lug upon an impulse-like relative axial movement of the filter element in a direction toward the fastening housing part and thereby effects a rotation of the filter element relative to the fastening housing part around the rotation/insertion axis for moving the detent means from the insertion/removal area into the locking area or from the retaining area into the insertion/removal area, depending on the position of the detent means in the recess before the axial movement is effected.

According to the invention, the detent connection is activated and deactivated with the switching device. For this purpose, an impulse-like axial movement of the filter element relative to the fastening housing part is converted into a relative rotation for moving the detent means in the areas of the recess. Such impulse-like axial movements can be generated preferably, with the filter housing being open, simply with one hand by hitting with the free end face of the filter element against a solid body, in particular a tabletop or a drain pan, without this requiring that the possibly fluid-contaminated filter element be directly touched. For assembling the filter, the filter element is inserted into the filter housing part. The switching lug is rotated with the switching device by a first impulse-like axial movement of the filter element from the insertion/removal area into the locking area. The filter element is thus secured in the fastening housing part, even when the latter is pointing with its open side in downward direction.

The fastening housing part with the filter element can thus be mounted in a simple and reliable way even at sites that are difficult to access, especially hidden sites, in an engine compartment, on an appropriate system-mounted housing part. For dismantling, the fastening housing part with the filter element is separated from the system-mounted housing part. When doing so, the detent means is rotated across the translation area automatically into the retaining area of the recess so that the filter element is retained in the fastening housing part. The fastening housing part can then be separated safely, without the filter element falling out, with one hand from the system-mounted housing part and, with the opening pointing in downward direction, can be put down to allow the residual fluid still contained in the fastening housing part to drain. Because the detent means are still locked within the retaining area, the filter element cannot fall out uncontrollably when carrying out a one-handed turning of the fastening housing part. For separating, another impulse-like axial movement is exerted on the filter element by means of which, with the aid of the switching device, the detent means is rotated from the retaining area into the insertion/removal area. Then the filter element is separated without resistance from the fastening housing part. The switching device can be located advantageously at the center of an end face of the filter element in order to save space. The detent device can be simply arranged on the circumferential side on the same or the other end face of the filter element. In reverse, the switching device can be also arranged on the circumferential side of one of the end faces and the detent device at the center of one of the end faces of the filter element. The detent means, in particular in the form of a detent lug, can be advantageously connected directly or by means of a detent ring or a similar connecting part on the filter element. The recess can be realized at an elevated part on the inner wall side of the fastening housing part. In this manner, the detent means, which is more susceptible to wear than the recesses, can be exchanged together with the filter element. The switching lug can be realized on a separate component, in particular a stationary cylinder or a dipping cylinder of a telescopic switching element. This component can be fastened releasably, in particular with a screw connection, to the fastening housing part so that it can be simply exchanged, in particular in case of wear. The component can thus be retrofitted also in existing fastening housing parts. The component can be prefabricated as a module and thus be mounted easily. The switching guide can be simply realized in particular in an axial recess of an end disc of the filter element. Since the detent connection and the switching device are matched to each other, it is prevented that a filter element can be mounted without a detent connection that is not matched to the fastening housing part or with a faulty detent connection and/or switching device. In this manner, interferences with the filter function, caused in particular by wrong assembly, are prevented.

Advantageously, the switching guide may be realized as a switching sleeve, which includes a succession of progressing switching teeth or angled guide members in circumferential direction. A switching sleeve with progressing switching teeth or angled guide members can be simply produced. In particular such switching guide can be simply shaped from plastic or cut, milled or punched from metal.

In another advantageous aspect of the invention, the switching device may comprise at least one elastic element, in particular a spiral compression spring, for realizing a pre-tension between the fastening housing part and the filter element. A restoring force, in particular a spring force, can thus be generated between the fastening housing part and the filter element. For connecting the fastening housing part with the other housing part, the filter element can be pushed against the elastic element into the fastening housing part in axial direction. The thus generated restoring force causes when changing, in particular releasing, the detent connection, such that the filter element is pressed in axial direction out of the fastening housing part. The filter element in this way releases in the fastening housing part a volume into which the residual fluid which has remained in the filter element can flow in. In this manner it is prevented that fluid reaches the surroundings when exchanging the filter element. The elastic element is matched to the filter element and the fastening housing part, so that an installation of the filter element is not possible without the matching elastic element. In this manner, malfunctions of the filter are prevented.

One of the switching components may advantageously comprise a telescopic switching element with a stationary cylinder and a dipping cylinder between which the elastic element is acting and which are inserted into each other, with generation of a pre-tension of the elastic element, for inserting the filter element into the fastening housing part. In a telescopic switching element, the stationary cylinder and the dipping cylinder are guided stably relatively to each other when carrying out axial movements.

Further, the telescopic switching element may comprise advantageously a releasable locking mechanism which is activated in the basic state and blocks pushing together the telescopic switching element, and the other switching component can comprise at least one release element which is matched to the locking mechanism such that the release element deactivates the locking mechanism when joining the telescopic switching element and the other switching component. The release element and the locking mechanism interact according to the lock-and-key principle wherein one of the components is connected with the filter element and the other component with the fastening housing part. To release the locking mechanism, the matching release element is necessary; otherwise, the extended telescopic switching element prevents that the filter element can be inserted completely into the fastening housing part. Then the filter element projects from the fastening housing part and this can be easily recognized from outside. In this manner, it is prevented that a filter element is employed that does not ting the filter.

In another advantageous aspect of the invention, a ring seal may be fastened in particular to an end face of the filter element for sealing relative to the filter housing and is adjustable axially, with respect to the rotation/insertion axis relative to the filter element. The ring seal may have advantageously a half moon-shaped profile so that the ring seal is curved on the radial exterior side and can optimally rest tightly against an appropriate sealing surface of the filter housing. In radial direction inwardly, the ring seal may be flat and, in order to save space, can rest against a suitable support ring which may carry and support the ring seal. The support ring may be connected with a simple guide mechanism to the filter element so as to be slideable relative thereto in axial direction. By means of the slideable ring seal the filter element on this end face is supported floatingly in the filter housing. The ring seal can be moved advantageously in particular at the time of opening and closing the filter housing. The ring seal can be simply exchanged together with the filter element. Advantageously, the slideable ring seal can be arranged at the end face that is facing away from the bottom of the fastening housing part outside of the fastening housing part and seal relative to the inside of the other, preferably system-mounted, housing part. When separating the fastening housing part from the other housing part, the ring seal can still seal up to the point of reaching its movement limit relative to the other housing part in order to prevent that fluid from the other housing part reaches the surroundings. When the ring seal is so designed that it seals relative to the other housing part, the wall thickness of the fastening housing part can be reduced advantageously. Moreover, by means of the moveable ring seal it can be prevented that a faulty ring seal or a ring seal that does not fit the filter housing or a filter element with a faulty or non-fitting ring seal is used so that disturbances of the filter function can be prevented in a simple way.

In the present invention, the technical object is solved according to the invention further in that the filter element includes a switching component that is adapted to interact with a switching component of the fastening housing part in such a way that a switching device embodied with the switching components, upon an impulse-like relative axial movement of the filter element in a direction toward the fastening housing part, causes a rotation of the filter element relative to the fastening housing part around the rotation/insertion axis of the filter in order to move the detent means in the recess, depending on the position of the detent means in the recess before effecting the axial movement. The advantages enumerated above in connection with the filter according to the invention extend likewise to the filter element.

In an advantageous aspect of the invention, a ring seal may be provided at an end face of the filter element for sealing relative to the filter housing, wherein the ring seal is slideable axially relative to the filter element. In this manner, the filter element can be supported floatingly in the filter housing. Further, the assembly and disassembly can be facilitated; in particular escape of fluid into the surroundings is prevented when dismantling. The ring seal can be exchanged simply together with the filter element.

The filter element may include advantageously at least one release element that is suited to deactivate a releasable locking mechanism of a telescopic switching element of the switching device upon installation of the filter element into the fastening housing part. The advantages mentioned above in connection with the release element of the filter according to the invention extend likewise to the filter element.

For the rest, the technical object is solved according to the invention in that the fastening housing part includes a switching component that is suited to interact with a switching component of the filter element such that a switching device embodied with the switching components, upon an impulse-like relative axial movement of the filter element in a direction toward the fastening housing part, causes a rotation of the filter element relative to the fastening housing part around a rotation/insertion axis of the filter in order to move the detent means into the recess, depending on the position of the detent means in the recess prior to effecting the axial movement. The advantages mentioned above in connection with the filter and filter element according to the invention extend likewise to the filter element.

Moreover, the technical object is solved according to the invention in that the telescopic switching element is adapted to be connected with the filter element or with the fastening housing part and the telescopic switching element includes at least one switching lug that extends radially relative to a rotation/insertion axis of the filter, the switching lug adapted to be guided in a switching guide that is connected appropriately with the fastening housing part or with the filter element in such a way that the switching guide guides the switching lug upon an impulse-like relative axial movement of the filter element in a direction toward the fastening housing part and thereby causes a rotation of the filter element relative to the fastening housing part around the rotation/insertion axis for actuation of the detent connection. The advantages mentioned above in connection with the filter, filter element and fastening housing part according to the invention extend likewise to the filter element.

Advantageously, the telescopic switching element may comprise a releasable locking mechanism which is activated in the basic state and blocks the telescopic switching element from being pushed together, and which is matched to a release element that is connected to the fastening housing part or to the filter element such that the release element, upon installation of the filter element into the fastening housing part, deactivates the locking mechanism.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 10 schematically depicts an isometric representation of further aspect of the invention having a filter element which is similar to the filter elements of FIGS. 1 to 7 and 9;

FIG. 11 schematically depicts a longitudinal section of an oil filter that is similar to the oil filters of FIGS. 1 and 7 with a moveable ring seal in the area of the screw connection of a housing cup with a housing cup;

FIG. 12 schematically depicts the ring seal of FIG. 11 in cross-section;

FIG. 18 schematically depicts the oil filter of FIG. 16 in the first assembly state in a part-sectional view;

FIG. 19 schematically depicts the oil filter of FIG. 17 in the final assembled state in a part-sectional view;

FIG. 20 schematically depicts the oil filter of FIG. 18 in the first assembly state without illustration of the filter element;

FIG. 21 schematically depicts the oil filter of FIG. 19 in the final assembled state without illustration of the filter element;

In the Figures above, same components are provided with the same reference characters.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
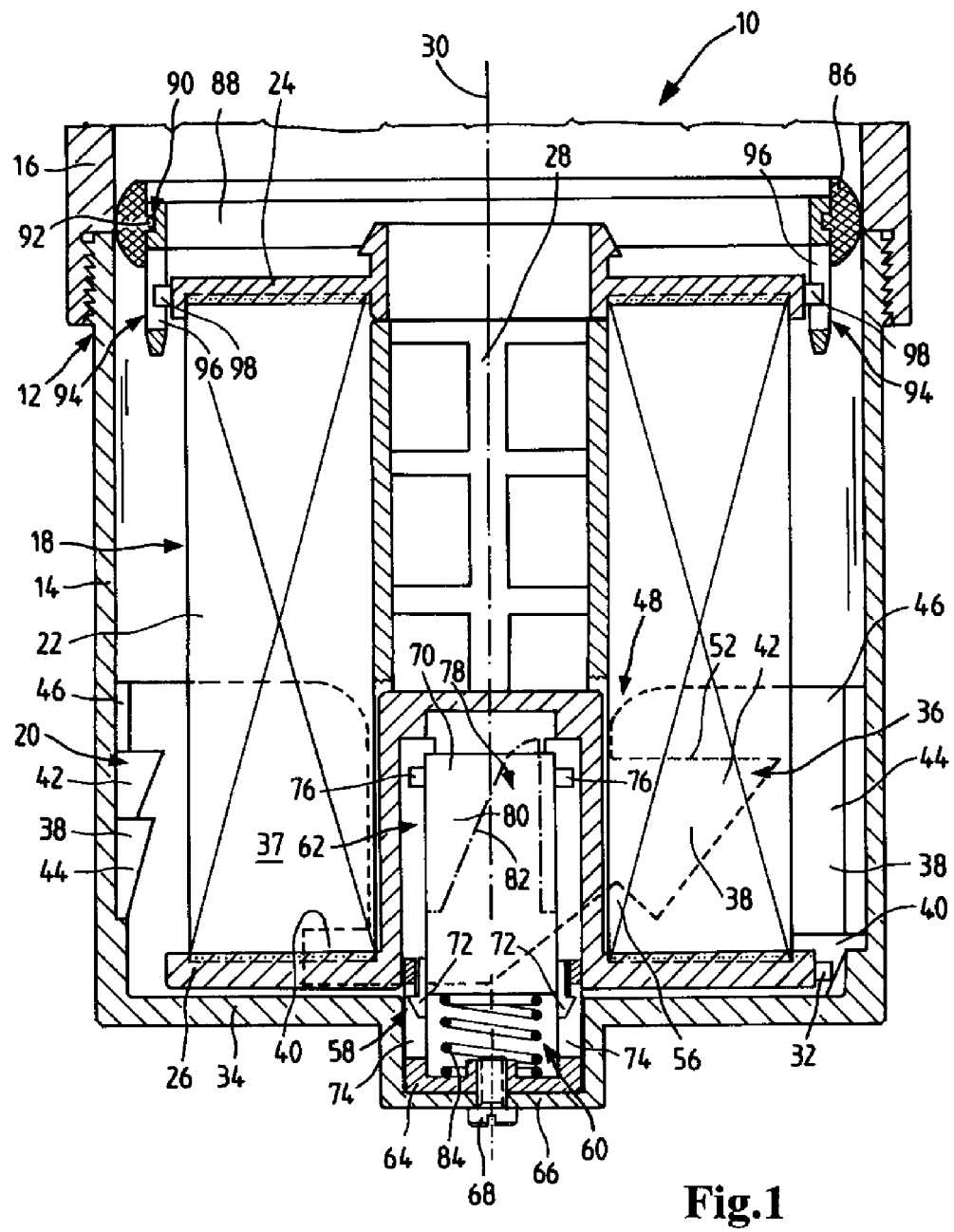
FIG. 1 schematically depicts a longitudinal section of an oil filter with an exchangeable filter element which is fastened with a releasable detent connection in a filter cup, wherein the detent connection is activatable and deactivatable with a switching device.

In FIG. 1 an oil filter 10 is shown for filtering engine oil of an internal combustion engine, not shown here, of a motor vehicle.

The oil filter 10 has a filter housing 12 which is composed of a filter cup 14 and a filter head 16. The filter head 16 is connected in a way of no further interest in this context to an engine oil system, not shown, of the internal combustion engine. The filter cup 14 is screwed from below into the filter head 16 and is suspended from it.

An interchangeable filter element 18 is fastened by means of a releasable detent connection 20 in the filter cup 14 that functions as a fastening housing part. The filter element 18 includes a filter medium 22 which is folded coaxially relative to a rotation/insertion axis 30 of the filter housing 12 in a zigzag shape. A seal end disc 24 and a detent end disc 26 are fastened to the end faces of the filter medium 22. In the interior of the filter medium 22 a support tube 28 that is fluid-permeable in radial direction extends between the seal end disc 24 and the detent end disc 26 coaxially to the rotation/insertion axis 30.

The rotation/insertion axis 30 is the axis relative to which during assembly or disassembly of the oil filter 10 the rotary and insertion movements of the filter head 16, the filter cup 14 and the filter element 18 relatively to each other occur. The term rotation/insertion axis 30 is used in the following for better clarity also for the individual components of the oil filter 10 with open filter housing 12 and is referenced in the Figures accordingly. In these cases, this refers to the respective axis of the component in question which coincides for the mounted oil filter 10 with the rotation/insertion axis 30 of the filter housing 12. The concepts "radial", "axial" and "in circumferential direction" refer to the rotation/insertion axis 30 or the corresponding axis of the respective component.

Figure 3:
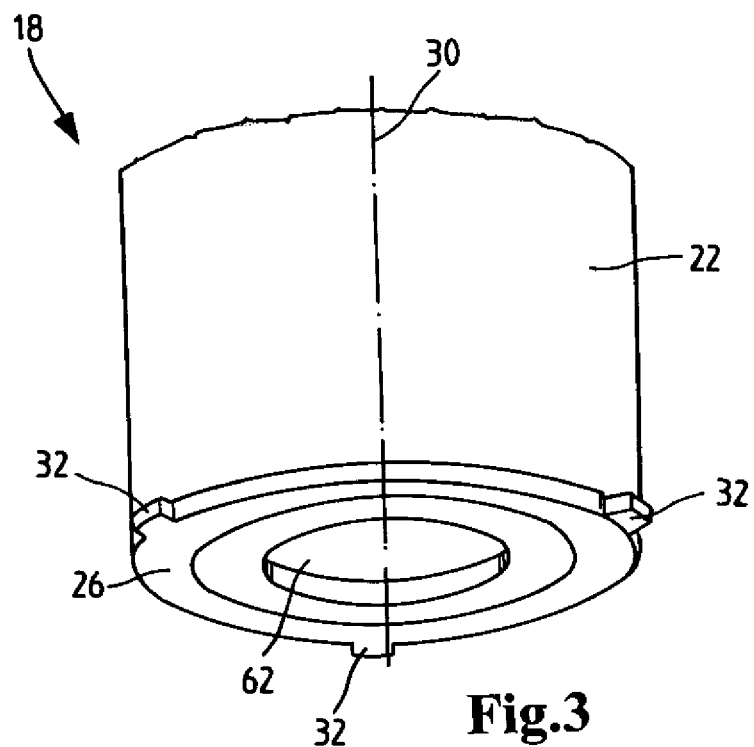
FIG. 3 is an isometric detail view of the detent end disc of the filter element of FIG. 2.

The detent connection 20 includes three detent lugs 32 as detent means which, as shown in particular in FIG. 3, are arranged evenly distributed on the circumferential side of the detent end disc 26 of the filter element 18 that is facing the bottom 34 of the filter cup 14. The detent lugs 32 extend in radial direction outwardly. The detent lugs 32 interact with a detent guide 36 of the detent connection 20.

The detent guide 36 is located near the bottom 34 on the radial inner circumferential side of the filter cup 14. The detent guide 36 includes an elevated part 37 extending in radial direction with three recesses 38 that in each case correspond with one of the detent lugs 32. In the recesses 38 the detent lugs 32 can lock in a bayonet-like manner. In FIG. 1, the area of the detent guide 36, which is hidden actually by the filter element 18, is indicated in dashed lines to improve comprehension. The recesses 38 comprise, as shown in particular in FIG. 2, in each case a locking area 40, a retaining area 42, a translation area 44 and an insertion/removal area 46.

The insertion/removal area 46 extends in axial direction. At its end that is facing the open side of the filter cup 14 the insertion/removal area 46 includes an opening 48. The opening 48 is formed all together approximately in a funnel shape. The edges are rounded, so that insertion of the detent lugs 32 is simplified. At its closed end, the insertion/removal area 46 passes into the locking area 40.

Figure 2:
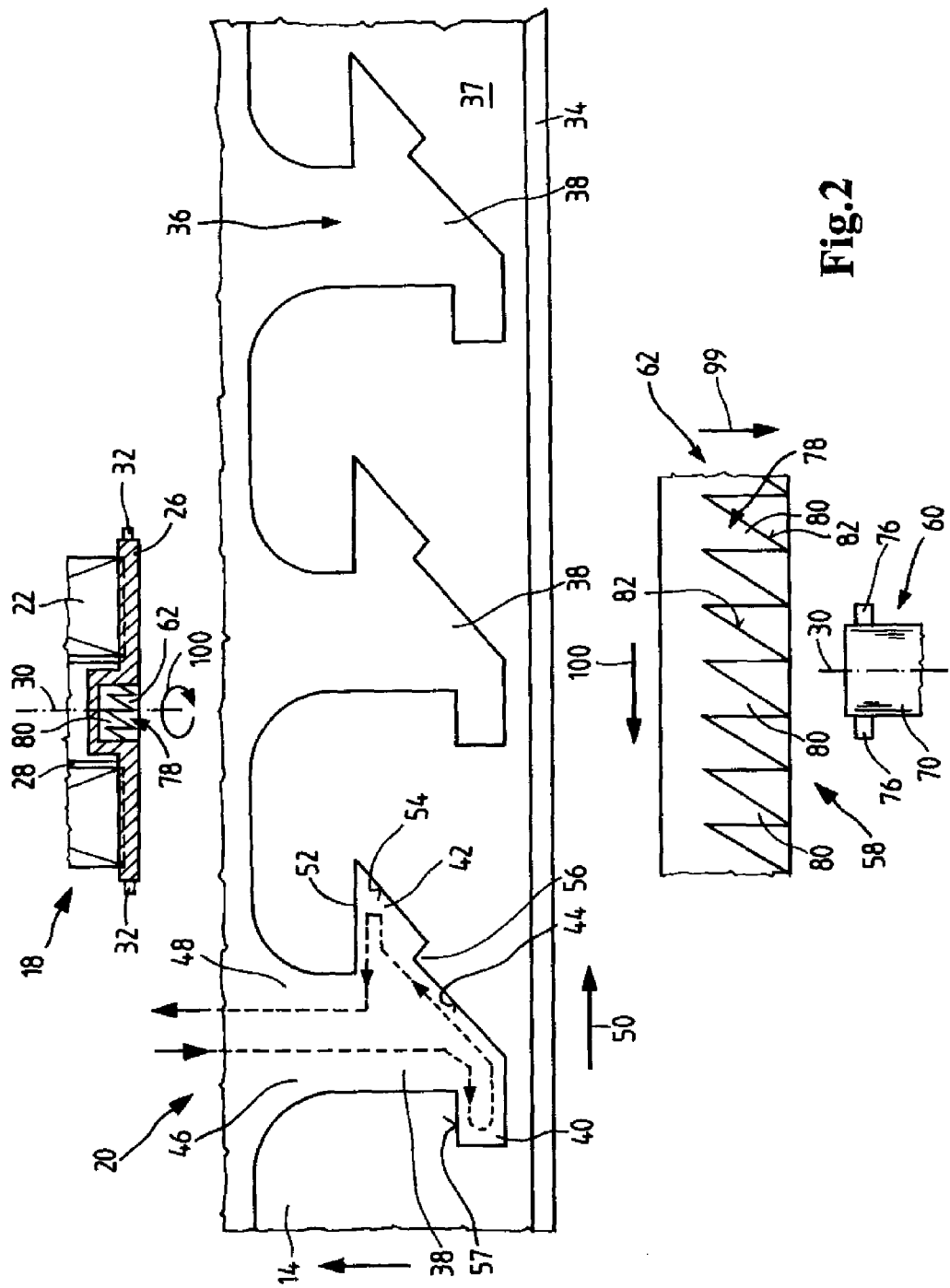
FIG. 2 schematically depicts an exploded view of the detent connection and of the switching device of the oil filter of FIG. 1 wherein from bottom to top a side view of a dipping cylinder, a developed view of the geometry of a switching sleeve of the switching device, a developed view of the geometry of a detent guide, and a longitudinal section of a detent end disc of the filter element with three detent lugs are shown.

The locking area 40 extends in circumferential direction on the rearward side of the insertion/removal area 46 relative to a rotational direction of locking of the filter cup 14. The rotational direction of locking is indicated in FIG. 2 by arrow 50.

The retaining area 42 is located in axial direction between the opening 48 of the insertion/removal area 46 and the locking area 40. It extends in circumferential direction at the front side of the insertion/removal area 46 relative to the rotational direction of locking 50 of the filter cup 14. A retaining side 52 of the retaining area 42 facing the opening 48 extends in a plane perpendicular to the rotation/insertion axis 30. An opposite guiding side 54 extends at an angle toward the retaining side 52 so that the retaining area 42 as a whole has an approximately triangular shape. Between the insertion/removal area 46 and the retaining area 42 a triangular projection 56 borders the guiding side 54 and tapers in axial direction away from the bottom 34. The projection 56 forms a surmountable stop for the detent lug 32. The projection 56 prevents that the filter element 18 is turned in the filter cup 14 unintentionally such that the detent lug 32 reaches the insertion/removal areas 46 causing the detent connection 20 to be released.

The axial distance between the retaining side 52 of the retaining area 42 and a locked position retaining side 57 on the side of the locking area 40 that is facing the opening 48 determines how far the filter element 18 projects in a secured position described below from the filter head 14.

The translation area 44 forms the closed end of the insertion/removal area 46. It extends at an angle to the rotation/insertion axis 30 of the filter cup 14 of the locked position retaining side 57 of the locking areas 40 to the projection 56 of the retaining area 42. The contour of the translation area 44 passes into the contour of the projection 56.

A switching device 58 includes a telescopic switching element 60 at the filter head 14 which corresponds with a switching sleeve 62 on the filter element 18.

The telescopic switching element 60 includes a hollow stationary cylinder 64 which is open at an end face and is closed at the other end face. The stationary cylinder 64 is fastened with a screw 68 at the closed end face in a depression 66 of the bottom 34 of the filter cup 14.

In the stationary cylinder 64 a coaxial dipping cylinder 70 is moveable axially relative to the rotation/insertion axis 30. The dipping cylinder 70 is also hollow and closed at one end face. The open end face of the dipping cylinder 70 is facing the closed end face of the stationary cylinder 64.

The dipping cylinder 70 includes at its open end face two spring hooks 72 which extend in axial direction and whose locking sides are directed in radial direction outwardly. The spring hooks 72 are guided in two suitable guide slots 74 in the circumferential side of the stationary cylinder 64. The guide slots 74 extend axially relative to the rotation/insertion axis 30. The guide slots 74 are closed relative to both end faces of the stationary cylinder 64. The dipping cylinder 70 is secured against rotation by means of the spring hooks 72 and is axially slideable in the stationary cylinder 64.

The dipping cylinder 70 includes two switching lugs 76 which are arranged on the radial external circumferential side and extend in radial direction outwardly. The switching lugs 76 are arranged near the closed end face of the dipping cylinder 70 on sides that are diametrically opposed relative to the rotation/insertion axis 30.

The switching sleeve 62 is a cylindrical depression which extends in the center of the detent end disc 26 of the filter element 18 in axial direction toward the seal end disc 24. The switching sleeve 62 includes at its radial inward side a switching guide 78 that projects in radial direction inwardly. The switching guide 78 includes a succession of progressing switching teeth 80 in circumferential direction. In FIG. 1 the area of the switching guide 78, which is actually hidden in that representation by the dipping cylinder 70, is shown in dash-dotted lines for better comprehension. Each progressing switching tooth 80 has, as shown in particular in FIG. 2, a surface extending in axial direction and a guide surface 82 extending at an angle thereto. The guide surfaces 82 are arranged on the side of the switching guide 78 that is facing the opening of the switching sleeve 62. The switching guide 78 serves for guiding the switching lugs 76 in case of an impulse-like relative axial movement of the filter element 18 into the filter cup 14.

Inside the telescopic switching element 60 a spiral compression spring 84 is arranged coaxially to the rotation/insertion axis 30. The spiral compression spring 84 is supported with one end on an end wall of the stationary cylinder 64 and with the other end on an end wall of the dipping cylinder 70. The spiral compression spring 84 of the telescopic switching element 60 serves for introducing a spring force that is acting axially to the rotation/insertion axis 30 for pressing the switching lugs 76 against the switching guide 78.

Figure 4:
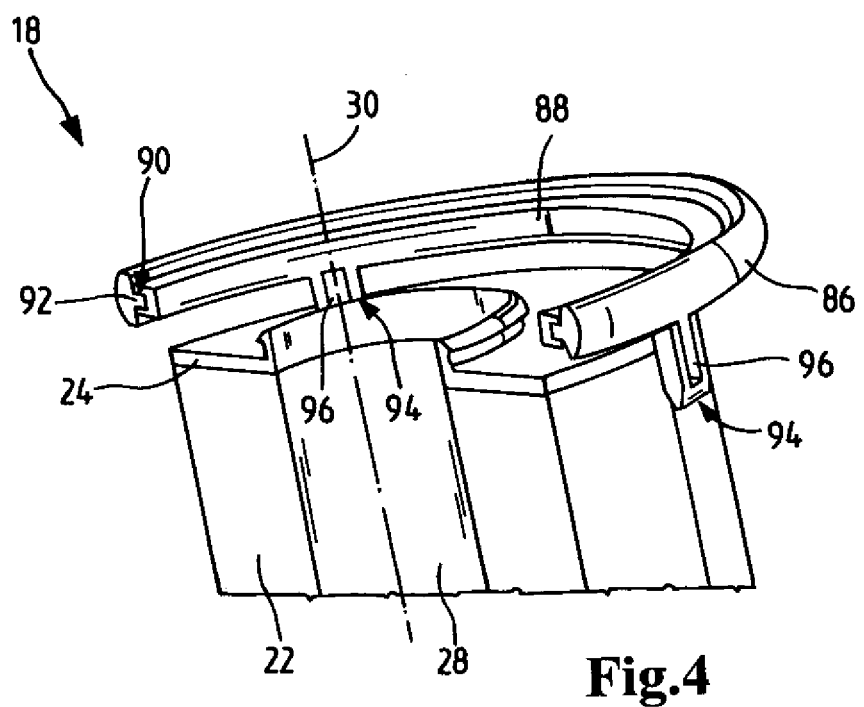
FIG. 4 is an isometric detail view of the filter element of FIGS. 1 to 3, cut in half in longitudinal direction, in the area of a seal end disc with a moveable ring seal.

On the seal end disc 24 of the filter element 18, as shown in the FIGS. 1 and 4, a flexible ring seal 86 for sealing relative to the filter housing 12 is arranged. The ring seal 86 is fastened coaxially to the rotation/insertion axis 30 on a shape-stable support ring 88 which is slideable, in turn, axially relative to the filter element 18. The ring seal 86 has a half moon-shaped profile whose curved side is positioned in radial direction outwardly. The straight axial inner side of the ring seal 86 rests flat against a radial outwardly positioned circumferential side of the support ring 88. In the radial outwardly positioned circumferential side of the support ring 88 there is a circumferential groove 90 engaged by a suitable projection 92 that is provided for holding the ring seal 86 on the support ring 88 and is located on the radial inner side of the ring seal 86.

On an end face of the support ring 88 which is facing the filter element 18 a plurality of guide frames 94 are arranged in circumferential distribution. The guide frames 94 each have an elongate guide gap 96 which extends in axial direction. The guide frames 94 taper at their free ends in order to facilitate assembly.

On the radial outer circumferential side of the seal end disc 24 there are guide projections 98 which correspond with the guide gaps 96. The guide projections 98 extend radially in outward direction. The guide frames 94 are guided on the guide projections 98.

The expansion of the guide projections 98 in circumferential direction corresponds approximately to the expansion of the guide gaps 96 in circumferential direction so that a relative movement between the support ring 88 and the seal end disc 24 relative to the rotation/insertion axis 30 is prevented.

The expansion of the guide gap 96 in axial direction is significantly bigger than the expansion of the guide projections 98 in axial direction so that a relative movement of the support ring 88 with the ring seal 86 is possible in axial direction relative to the filter element 18.

For assembly of the oil filter 10, the filter element 18 with the detent end disc 26 leading is inserted axially relative to the rotation/insertion axis 30 into the filter cup 14. In this context, it may possibly be necessary to turn the filter element 18 in the filter cup 14 somewhat around the rotation/insertion axis 30 so that the three detent lugs 32 are able to glide unhindered in each case into one of the insertion/removal areas 46 of the detent guide 36. This is facilitated by the funnel-shaped openings 48 with the rounded edges. Upon insertion of the filter element 18, the dipping cylinder 70 dips into the switching sleeve 62. The spiral compression spring 84 ensures that the filter element 18 is not immersed completely into the filter cup 14. The filter element 18 projects from the filter cup 14 in this phase of assembly. The support ring 88 with the ring seal 86 is outside of the filter cup 14.

By means of the geometrically matched pairs of the detent lugs 32 with the recesses 38 of the detent guide 14 and the pairing of the switching lugs 76 of the dipping cylinder 70 with the switching guide 78 of the switching sleeve 62, it is prevented that the filter element 18 can be mounted wrongly or that a non-matching filter element can be used. In this manner, the risk that malfunctions of the oil filter 10 occur is reduced.

The filter element 18 is pressed for activation of the detent connection 20 with an impulse-like movement in axial direction into the filter cup 14 in. In this context, the movement direction of the switching guide 78 is indicated in FIG. 2 with arrow 99. This axial movement can be generated by pressing with one hand or by pressing the filter cup 14 with the free end face of the filter element 18 against a tabletop or another stable object. With the axial movement the switching lugs 76 of the dipping cylinder 70 are guided along the guide surfaces 82 of the switching guide 78 so that a rotation of the filter element 18 is caused relatively to the filter cup 14 around the rotation/insertion axis 30. In this context, the rotation direction of the filter element 18 is indicated in FIG. 2 by arrows 100. The detent lugs 32 are moved from the insertion/removal areas 46 of the respective recess 38 into the locking areas 40 by the rotation of the filter element 18.

Figure 14:
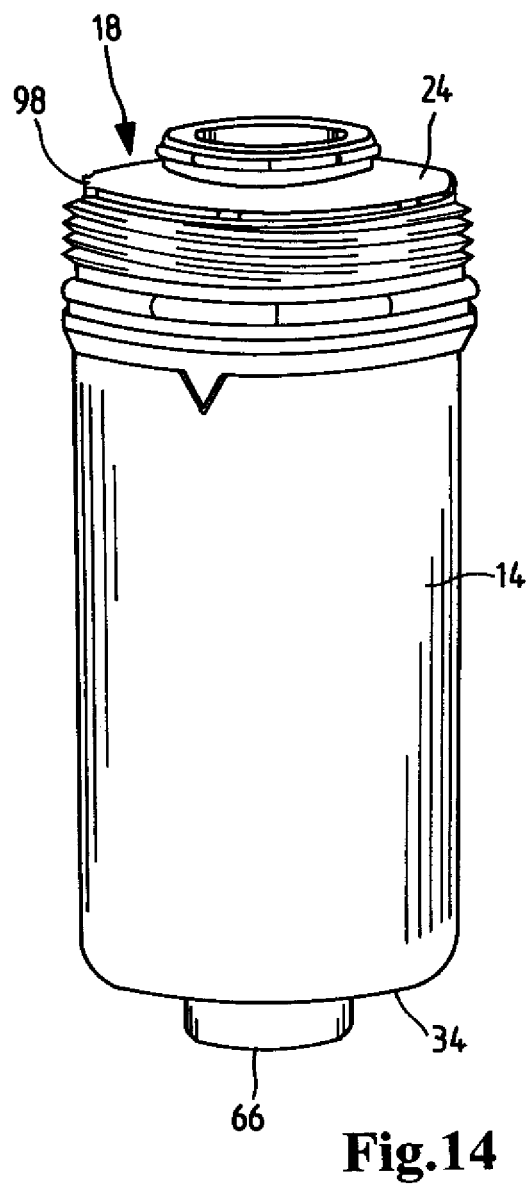
FIG. 14 schematically depicts an isometric representation of the filter cup with the filter element of the oil filter of FIG. 1 in an assembly state before connecting with the filter head.

The locking areas 40 serve for receiving the detent lugs 32 when screw-connecting the filter cup 14 with the filter head 16. In this dismantling phase the filter element 18 presses against the spiral compression spring 84 so that the latter is pre-tensioned. The ring seal 86 is resting on the edge of the filter cup 14. For better clarity, in FIG. 14 the illustration of the ring seal 86 has been omitted. The filter element 18 is secured by the detent connection 20 in the filter cup 14 so that the latter, for joining with the filter head 16, can be turned or tilted in all spatial directions without the filter element 18 falling out. In this manner, an assembly, hidden from view, f the filter cup 14 in the filter head 16 is easily possible.

The filter cup 14 with the filter element 18 is screwed from below into the filter head 16. In this context, the detent lugs 32 are still secured in the locking areas 40. The ring seal 86 is resting in the installation position shown in FIG. 1 tightly against suitable sealing surfaces at the inner wall of the filter head 16 and separates the clean side of the filter element 18 from the raw side.

For dismantling, the filter cup 14 is unscrewed in opposite direction of rotation from the filter head 16. In this context, by friction between the filter element 18, in particular the ring seal 86, and the filter head 16 it is effected that the filter element 18 is somewhat turned in the filter cup 14. When doing so, the detent lugs 32 move out of the locking areas 40 into the respective translation areas 44. Upon further unscrewing, the detent lugs 32 are guided along the translation areas 44 into the retaining areas 42. By relative movement of the filter element 18 in axial direction out of the filter cup 14, a volume is released at the bottom 34 of the filter cup 14 in which the residual oil is caught that is still contained in the filter housing 12. In this manner, it is prevented that oil reaches the surroundings when exchanging the filter element 18 from the oil filter 10.

During the further opening phase of the filter housing 12, the detent lugs 32 are retained in the retaining areas 42. In this retaining position, the filter element 18 projects by about 1 cm out of the filter cup 14.

Moreover, the ring seal 86 is moved during the opening phase axially with respect to the rotation/insertion axis 30 relative to the filter element 18. While unscrewing, the ring seal 86 remains in the filter head 16 until the guide projections 98 of the seal end disc 24 hit the boundaries of the guide gaps 96 at the free ends of the guide frames 94 of the support ring 88. Thus, it is prevented that the oil escapes to the surroundings.

Figure 15:
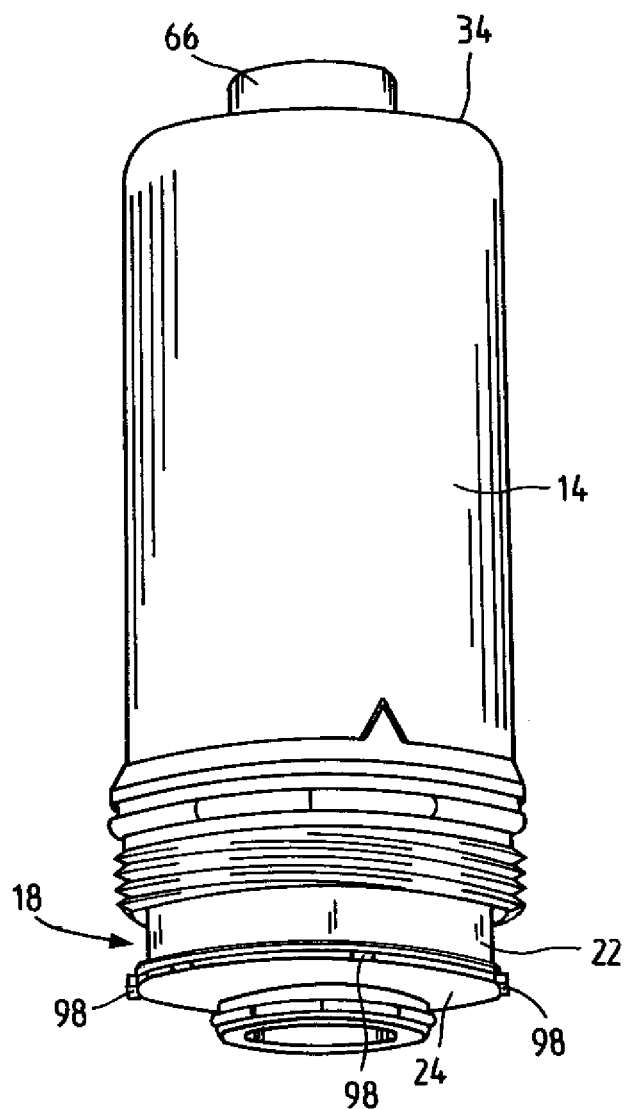
FIG. 15 schematically depicts an isometric representation of the filter cup with the filter element of FIGS. 1 and 14 in a dismantled state for draining off the residual oil.
Figures 16, 17:
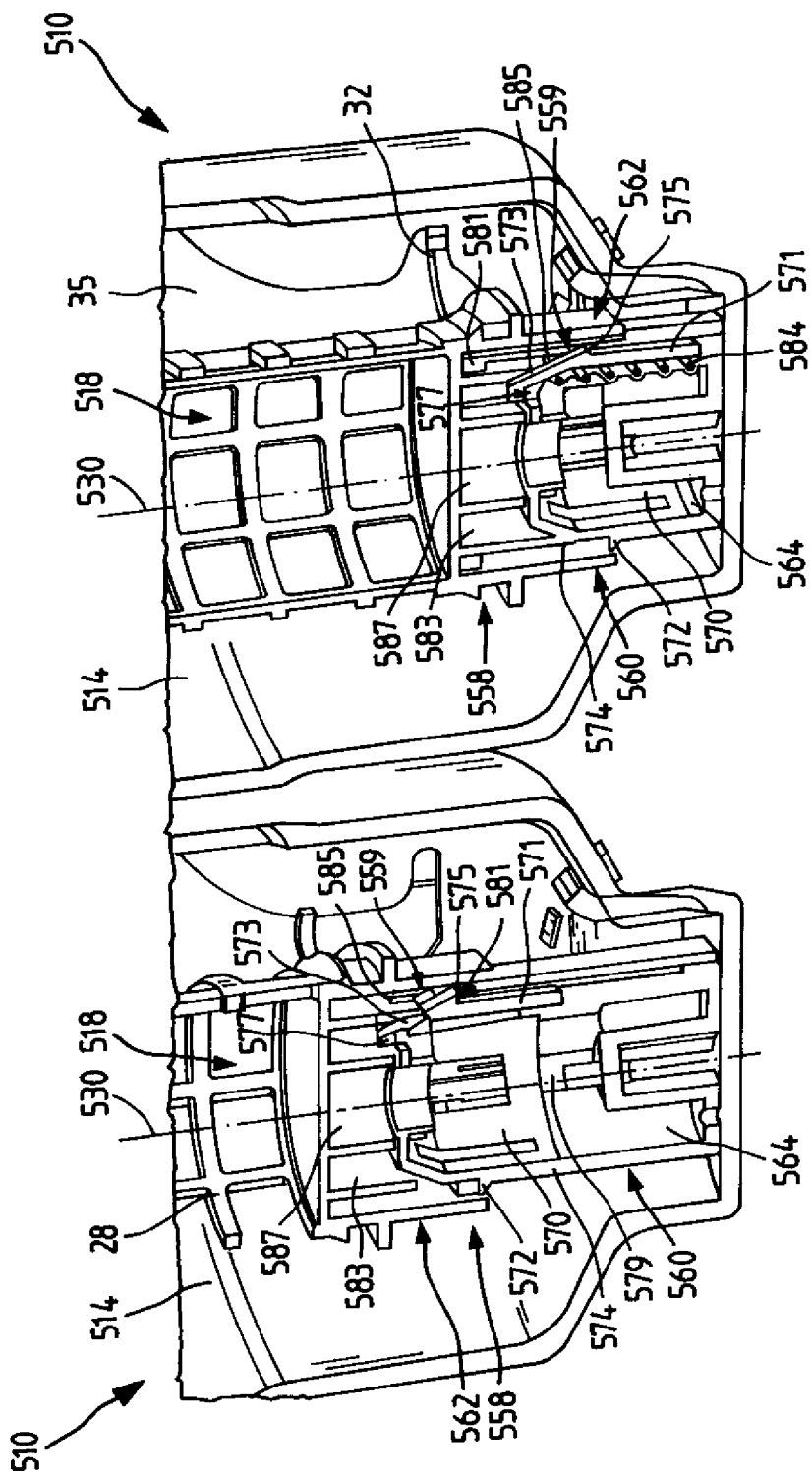
FIG. 16 schematically depicts a longitudinal section of an oil filter with a filter element according to a fifth embodiment which is similar to the oil filter of FIGS. 7 and 8 in the area of a detent connection and a switching device in a first assembly state.
FIG. 17 schematically depicts the oil filter of FIG. 16 in the final assembled state.

The filter head 16 completely separated from filter cup 14 is turned upside down, so that its open side points downwardly. When doing so, the filter element 18 is retained with the detent connection 20 in the filter cup 14 so that it cannot uncontrollably fall from the filter cup 14. This dismantling state is shown in FIG. 15. The representation of the ring seal 86 was omitted for better clarity. The filter cup 14 can be placed with the open side facing down for draining the oil, for example, into a drain pan or a different type of support.

The filter element 18 is pressed with an impulse-like movement in axial direction into the filter cup 14. This can be done, for example, by pressing with one hand onto the bottom 34 of the filter cup 14 wherein the free end face of the filter element 18 is pressed against the drain pan. In this connection, the switching lugs 76 of the dipping cylinder 70 are guided along the guide surfaces 82 of the switching guide 78 so that a rotation of the filter element 18 relative to the filter cup 14 is effected around the rotation/insertion axis 30.

With this rotation of the filter element 18, the detent lugs 32 are moved from the retaining areas 42 into the insertion/removal areas 46 for deactivation of the detent connection 20. In the insertion/removal areas 46, the detent lugs 32 and the recesses 38 can be separated from each other unhindered.

After deactivation of the detent connection 20, the spiral compression spring 84 can relax and, in this way, causes the filter element 18 to be pushed in axial direction out of the filter cup 14. When lifting the filter cup 14, the filter element 18 remains in the drain pan.

All together, the filter cup 14 with the filter element 18 can be mounted in a simple way with one hand even at hard-to-access and/or hidden sites, for example, in an engine compartment. A used filter element 18 can be exchanged simply with one hand and the oil-smeared filter element 18 itself must not be touched.

In a second embodiment, shown in FIGS. 5 to 8, those elements which are similar to those of the first embodiment described in FIGS. 1 to 4 are provided with the same reference characters so that with regard to their description reference is being had to the explanations relating to the first embodiment. This embodiment differs from the first one by the fact that the detent lugs 32 are arranged at the free ends of two detent wings 132 that are diametrically opposed relative to the rotation/insertion axis 30. The detent wings 132 are arranged on a detent ring 133 which is fastened coaxially to the rotation/insertion axis 30 on the exterior side of the detent end disc 26 that is facing away from the filter medium 22. The detent wings 132 extend basically in radial direction outwardly. The free ends of the detent wings 132 are bent in the same circumferential direction and form the detent lugs 32. The detent guide 36 is configured similar to the detent guide 36 of the first embodiment.

In the second embodiment, the switching guide 78 has switching angled members 182 instead of the progressing switching teeth 80 of the first embodiment.

Figure 5:
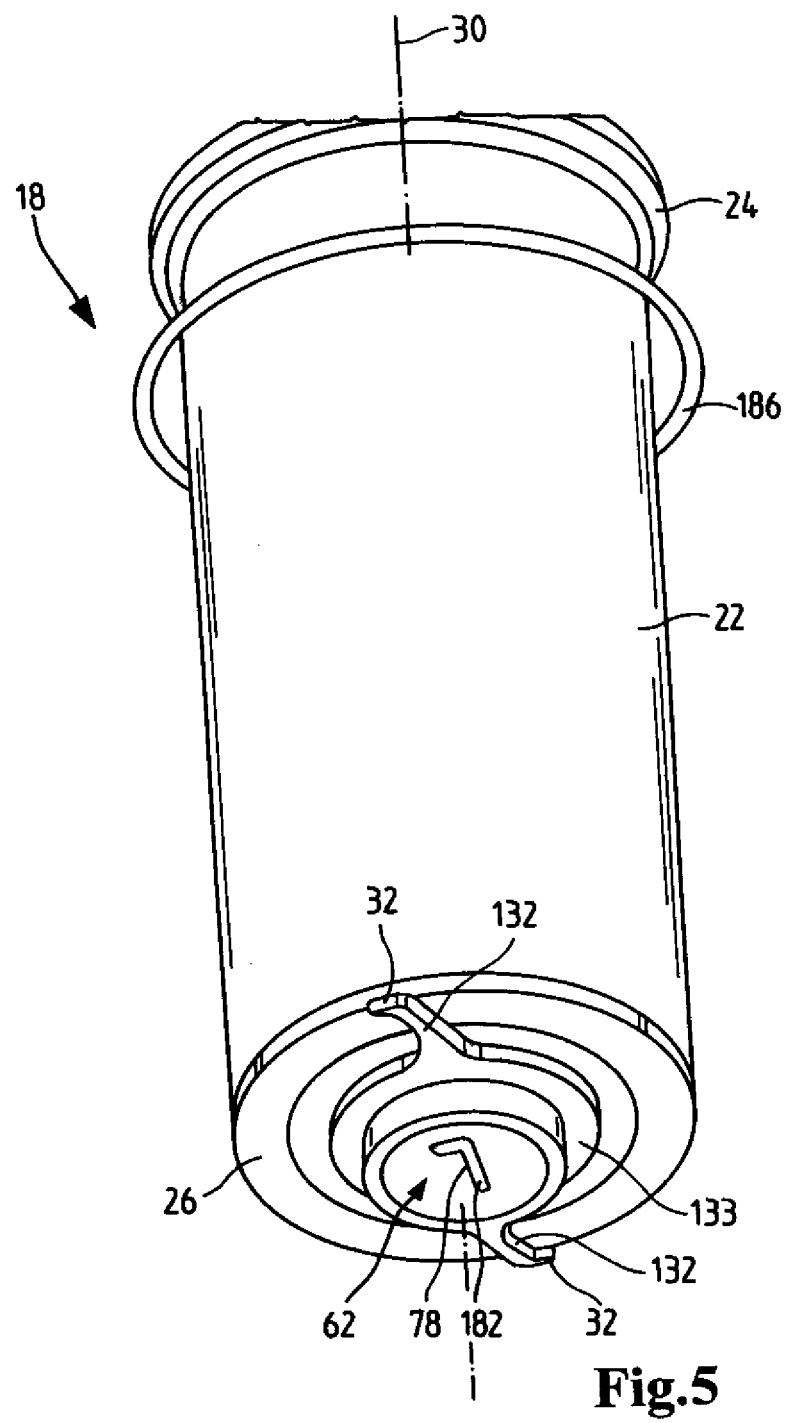
FIG. 5 is an isometric representation of another aspect of a filter element according to the invention present in the filter element of FIG. 1.
Figure 6:
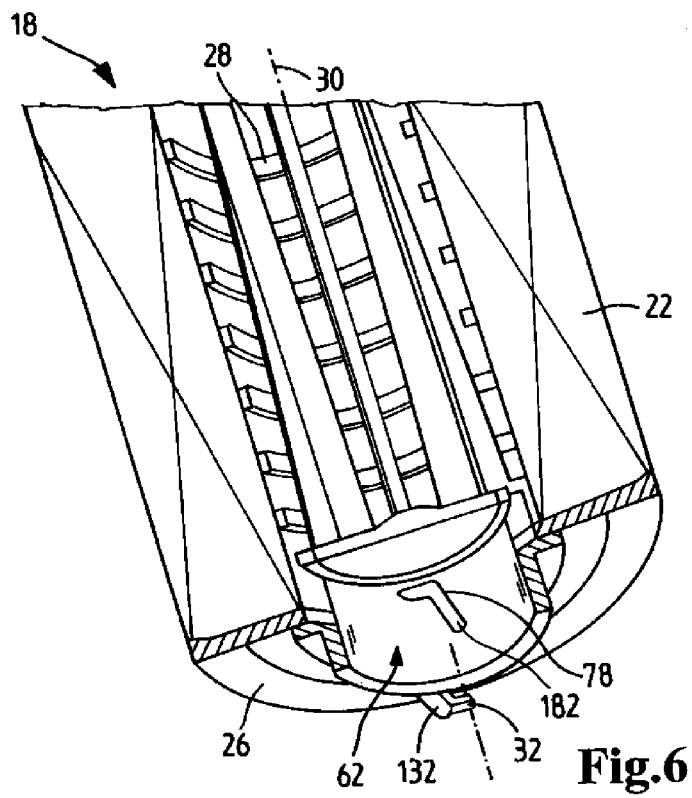
FIG. 6 is an isometric representation of the filter element of FIG. 5, cut in half in longitudinal direction, in the area of a detent end disc.

A moveable ring seal 186, as shown in FIG. 5, is arranged in the second embodiment in axial direction between the seal end disc 24 and the detent end disc 26. The ring seal 186 seals in the installed position, not shown in FIG. 5, in the area of the seal end disc 24.

Figure 7:
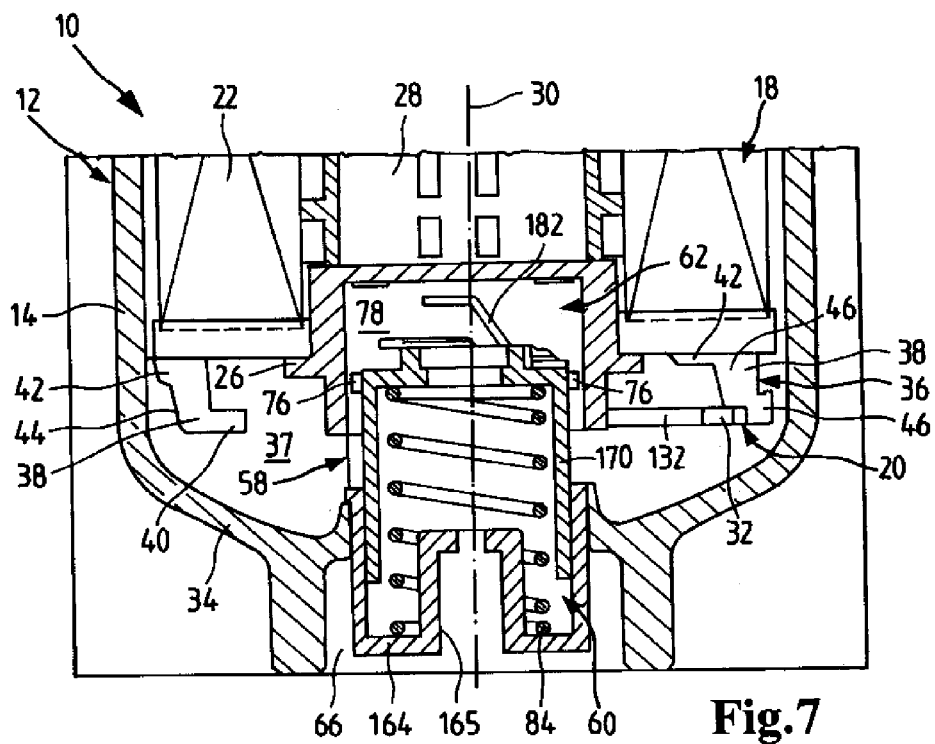
FIG. 7 schematically depicts a longitudinal section of an oil filter with the filter element according to the inventive aspects presented in FIGS. 5 and 6 in the area of the detent connection and the switching device.

In FIG. 7, a detail of the detent guide 36 is shown which includes alternative recesses 38 which are similar to the recesses 38 according to the first embodiment.

Figure 8:
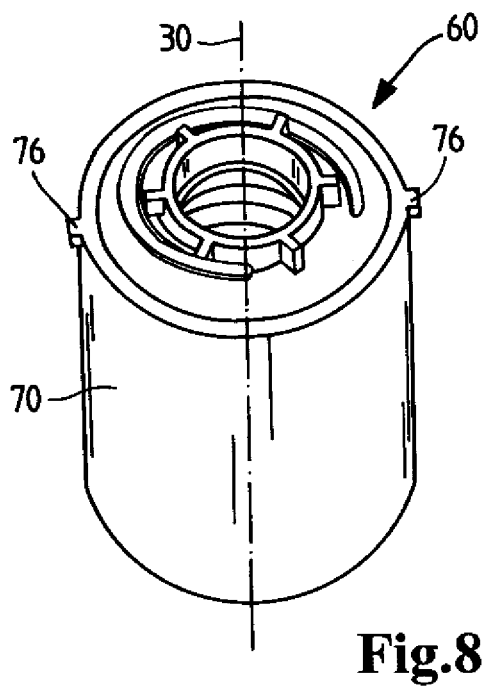
FIG. 8 schematically depicts an isometric representation of a dipping cylinder of the oil filter of FIG. 7.

The stationary cylinder 164 of the modular telescopic switching element 60 includes a central support sleeve 165 for centering the spiral compression spring 84. The spiral compression spring 84 is embedded at one end in the end wall of the dipping cylinder 170. The telescopic switching element 60 is shown in FIG. 8 in isometric representation.

Figure 9:
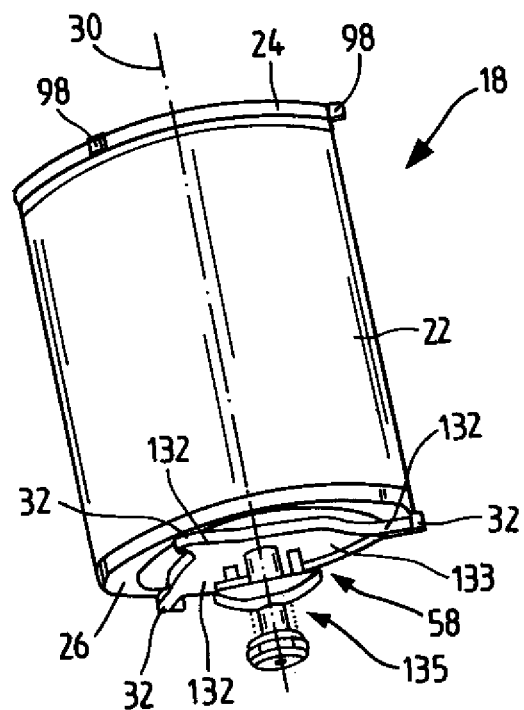
FIG. 9 schematically depicts an isometric representation of a another aspect of the invention with a filter element which is similar to the filter elements of FIGS. 1 to 7.

In a filter element 18 according to a third embodiment, shown in FIG. 9, those elements which are similar to those of the first embodiment described in FIGS. 1 to 4 are provided with the same reference characters so that with regard to their description reference is being had to the explanations provided for the first embodiment. This embodiment differs from first one in that, similar to the second embodiment, three detent wings 132 with the detent lugs 32 are provided in a distributed arrangement in circumferential direction and extend basically in radial direction outwardly. They are arranged in analogy to the second embodiment on a detent ring 133.

In addition, the third embodiment includes an alternative switching device 58 which is connected with a drain valve 135 that is of no further interest here.

In a filter element 18 according to a fourth embodiment, shown in FIG. 10, four detent lugs 32 are provided instead of three detent lugs 32 of the first embodiment. This affects positively the force distribution when retaining the filter element 18 in the filter cup 14. Further, the guide projections 98 for guiding the support ring, not shown in FIG. 10, for the slideable ring seal are arranged on a guide ring 200 that is coaxial to the rotation/insertion axis 30. The guide ring 200 is fastened to the outside of the seal end disc 24 that is facing away from the filter medium 22.

In FIG. 11, a detail view of an axially slideable ring seal 86 with half moon-shaped profile is shown according to a fifth embodiment. The ring seal 86 is arranged, as in the first embodiment of FIGS. 1 to 4, on a support ring 88. In contrast to the first embodiment, the guide projections 98 for guiding the guide frames 94 of the support ring 88 are however on the radial inner side of a cylindrical wall 202 of the seal end disc 24 of the filter element 18. In addition, the seal end disc 24 includes a radial outwardly extending projection 204 which when the filter housing 12 is mounted is resting against an end face edge of the filter cup 14. Between the opposed end face of the projection 204 and an appropriate end face edge of the filter head 16, the ring seal 86 is arranged. In FIG. 12, the ring seal 86 of FIG. 1 is shown in the relaxed state (I) and in the compressed state (II), as it exists when the filter housing 12 is mounted.

Figure 13:
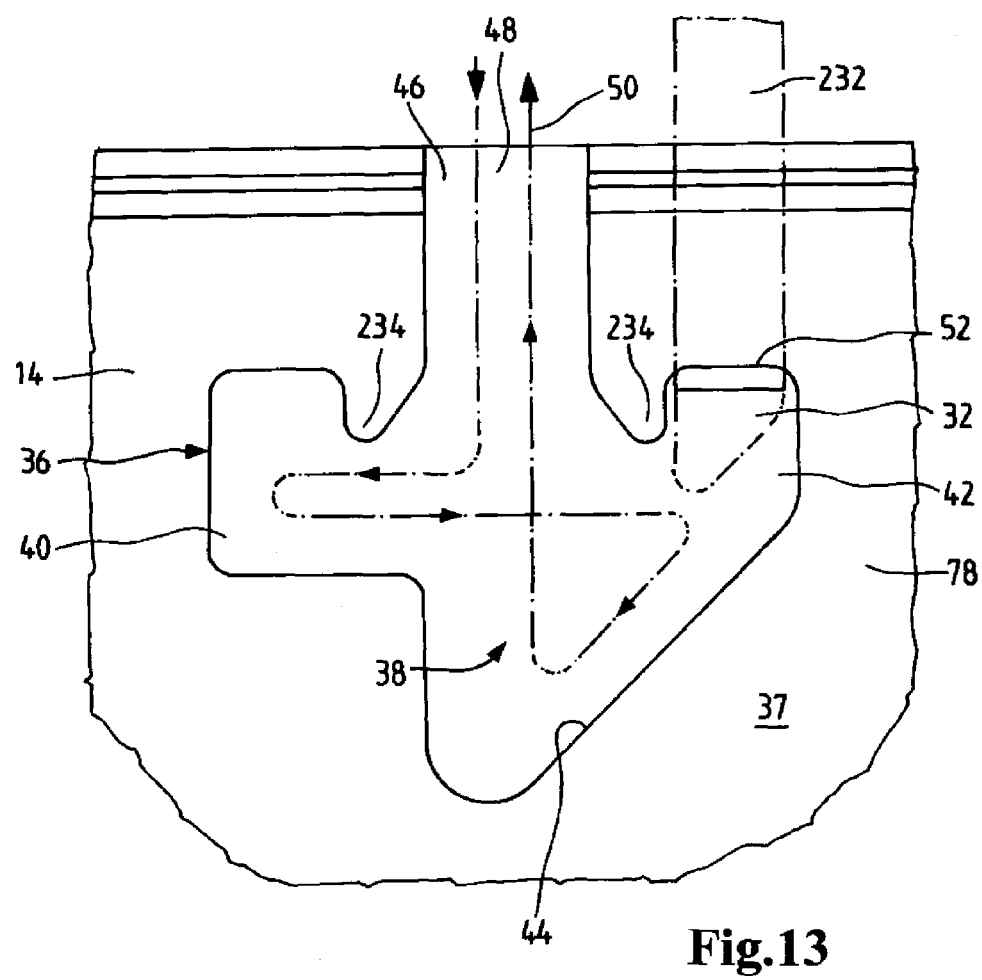
FIG. 13 schematically depicts a detail of an alternative detent guide which is similar to the detent guide of FIG. 2.

In FIG. 13, an alternative recess 38 of a switching guide 78 is shown which is similar to the switching guide 78 of the first embodiment according to FIGS. 1 and 4. Here, a detent hook 232 is illustrated in dashed lines and includes the detent lug 32 at its free end. In contrast to the first embodiment, the retaining area 42 and the locking area 40 in each case have an axially extending projection 234 at their end that is facing the insertion/removal area 46 at the side that is facing the opening 48. The projections 234 prevent the detent lugs 32 from unintentional rotation into the insertion/removal area 46 and thus from unintentional deactivation of the detent connection 20.

In a fifth embodiment, shown in FIGS. 16 to 27, reference is being had to the explanations provided for the first or second embodiment with respect to those elements which are similar to those of the first embodiment described in FIGS. 1 to 4 and to those of the second embodiment described in FIGS. 5 to 8. FIGS. 16, 18, 20 and 22 show a first assembly state during installation of the filter element 518 into the filter cup 514. FIGS. 17, 19, 21 and 23 show a final assembled state of the filter element 518 in the filter cup 514. The representation of the filter medium on the support tube 28 was omitted in FIGS. 16 to 27 for better clarity. In FIGS. 20 and 21 the representation of the filter element 518 was omitted in favor of clear illustration of the telescopic switching element 560.

The fifth embodiment differs from the first and the second embodiment in that the switching device 558 includes a locking mechanism 559 which is activated in the basic state of the telescopic switching element 560 and blocks pushing together the telescopic switching element 560.

Figure 27:
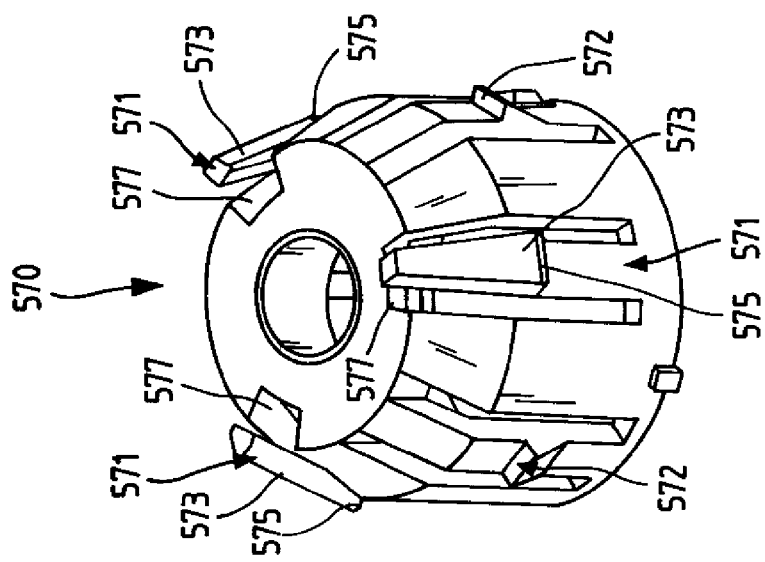
FIG. 27 depicts the dipping cylinder of FIG. 27 with a view of the outside.
Figure 26:
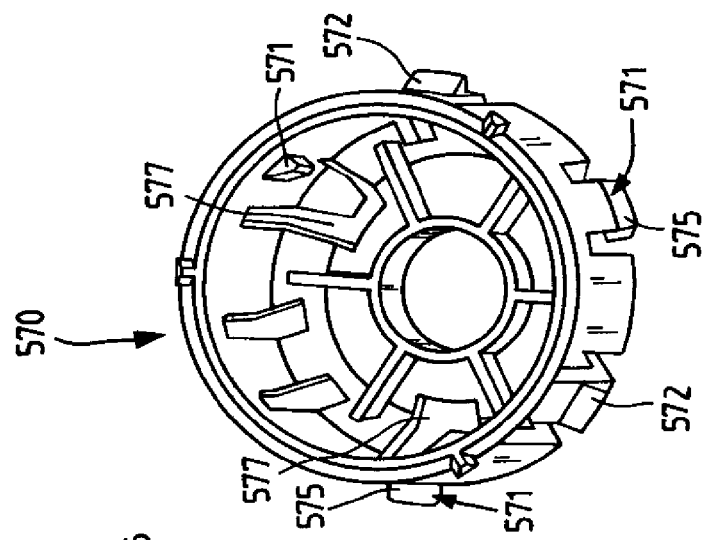
FIG. 26 depicts a dipping cylinder of the telescopic switching element of the switching device of the oil filter of FIG. 16 viewed in the direction of the inside.
Figure 25:
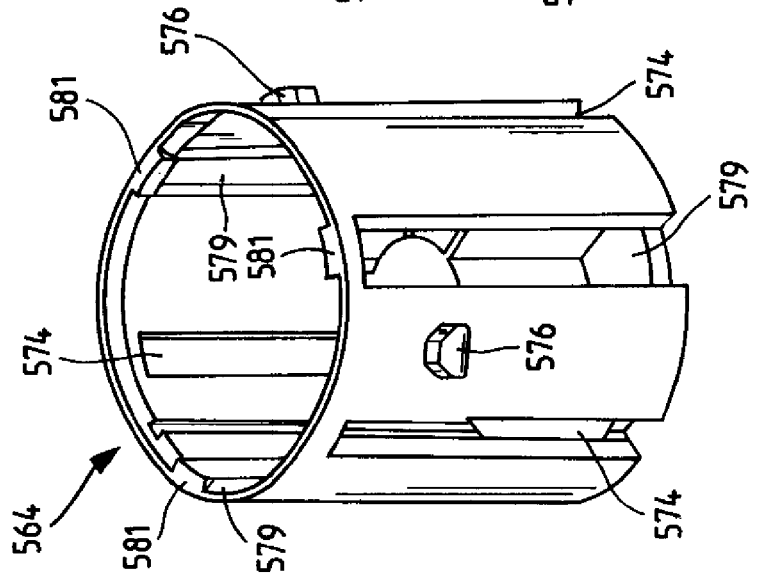
FIG. 25 depicts a stationary cylinder of a telescopic switching element of the switching device of the oil filter of FIG. 16.

The dipping cylinder 570 of the telescopic switching element 560, as shown in particular in FIG. 27, is shaped conically at its closed end face that is facing away from the stationary cylinder 564. For better clarity, the spiral compression spring 584 which forces the dipping cylinder 570 away from the stationary cylinder 564 in the basic state of the telescopic switching element 560 is indicated only in FIG. 17.

Three radial springy locking spring hooks 571 of the locking mechanism 559 are arranged in symmetric distribution relative to the rotation/insertion axis 530 in axial recesses in the circumferential wall of the dipping cylinder 570. They extend in axial direction. Their free ends are located at the closed end face of the dipping cylinder 570 and project past the latter in axial direction. The free ends of the locking spring hooks 571 are formed to detent projections 573 which projects in radial direction outwardly. In the area of the detent projections 573, the locking spring hooks 571 are bent radially in inward direction.

The detent projections 573 project past the conical area of the dipping cylinder 570 in radial direction. On their sides facing away from the free ends of the locking spring hooks 571, the detent projections 573 have locking steps 575. The locking steps 575 project past the cylindrical segment of the circumferential wall of the dipping cylinder 570 in radial direction.

The end wall at the closed end face of the dipping cylinder 570 includes circumferentially three indentations 577 which pass into recesses in which the locking spring hooks 571 are located. The locking spring hooks 571 can engage the indentations 577 by spring action in radial direction so that the radial outer sides of the detent projections 573 are positioned in radial direction at the level of the radial outer side of the cylindrical segment of the circumferential wall of the dipping cylinder 570 or even radially inside thereof.

Between two of the locking spring hooks 571, respectively, there is arranged one of a total of three spring hooks 572 on the radial outer side of the cylindrical segment of the circumferential wall of the dipping cylinder 570. The spring hooks 572 are guided in three suitable guide slots 574 in the circumferential wall of the stationary cylinder 564; this is shown in particular in FIG. 25. The guide slots 574 extend axially relative to the rotation/insertion axis 530.

The stationary cylinder 564 includes in its circumferential wall between two of the guide slits 574, respectively, one of a total of three locking guide slots 579 in which the detent projections 573 of the locking spring hooks 571 of the dipping cylinder 570 are guided. The locking guidance slots 579 extend axially relative to the rotation/insertion axis 530.

The edge at the open end face of the stationary cylinder 564 is beveled on the radial inner side, exclusive of those areas in which the locking guide slots 579 adjoin. In this manner, the spring hooks 572 are able to glide more easily into the guide slots 574 when assembling the telescopic switching element 560. In the area of the locking guide slots 579 the edge of the stationary cylinder 564 is formed to locking stops 581 for the locking steps 575 of the locking spring hooks 571.

Between one of the guide slots 574 and one the locking guide slots 579, respectively, a switching lug 576 is arranged on the radial outer side of the circumferential wall of the stationary cylinder 564 and extends in radial direction outwardly. The switching lugs 576 are approximately of parallelepipedal shape wherein two corners is slanted that, upon installation of the filter element 518, are resting on a guide surface 582 of the switching guide 578 of the switching sleeve 562, shown in FIGS. 18 and 19 in particular.

Figure 24:
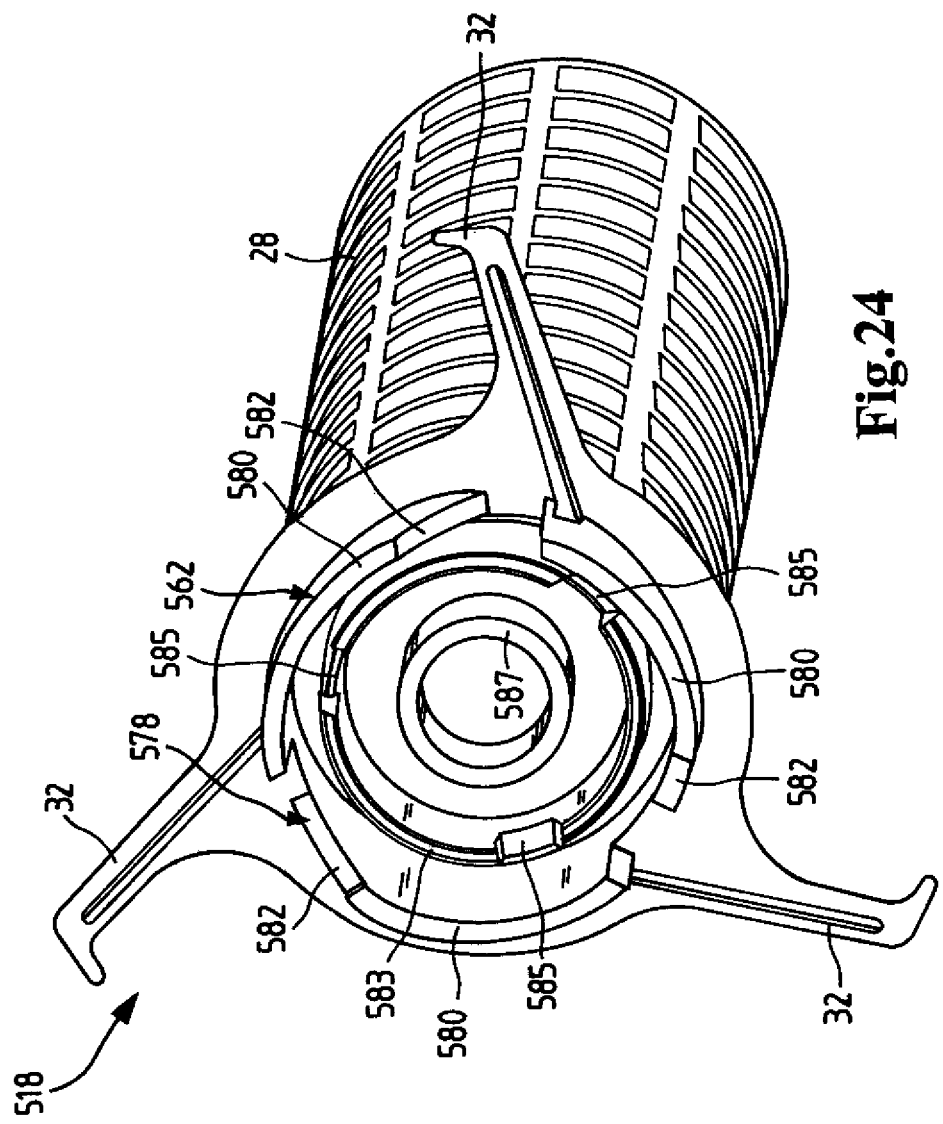
FIG. 24 is a detail view of the filter element of the oil filter of FIG. 16.

On the filter element 518 a release sleeve 583, as shown in particular in FIG. 24, is arranged coaxially within switching sleeve 562. The release sleeve 583 is adapted, for deactivation of the locking mechanism 559, to the geometry of the locking spring hooks 571 of the dipping cylinder 570. On the edge of the open end face of the release sleeve 583 the radius of its radial inner circumferential side is greater than the distance between the radial outer side of the detent projections 573 at the free end of the locking spring hooks 571 and the rotation/ insertion axis 530. In this manner, when inserting the telescopic switching element 560 into the switching sleeve 562, the release sleeve 583 can press in radial direction from the outside against the detent projections 573 and bend the locking spring hooks 571 in radial direction inwardly. In this connection, the locking steps 575 are pushed away by the locking stops 581 of the stationary cylinder 564 in radial direction inwardly so that the locking mechanism 559 is deactivated and the telescopic switching element 560 can be pushed together.

When it is attempted to install a filter element into the filter cup 514 without the release sleeve 583 that is matching the telescopic switching element 560, the locking mechanism 559 remains activated and the telescopic switching element 560 cannot be pushed together. The extended telescopic switching element 560 prevents the installation of the filter element that does not fit, which is recognizable clearly from the outside. In this manner, limitations and/or disturbances of the filter function of the oil filter 510 which can be caused by using a filter element that does not fit are prevented.

Figure 23:
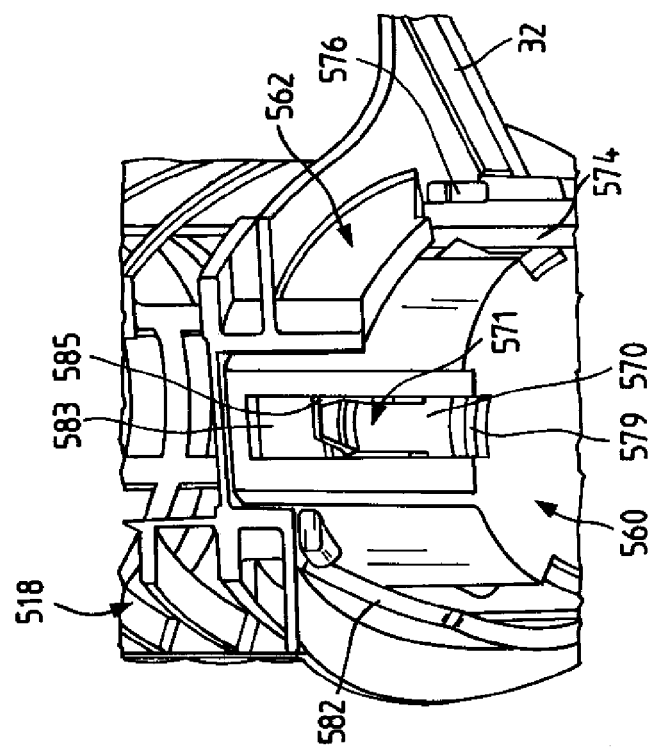
FIG. 23 is a detail view of the switching device of the oil filter of FIG. 17 in the final assembled state.
Figure 22:
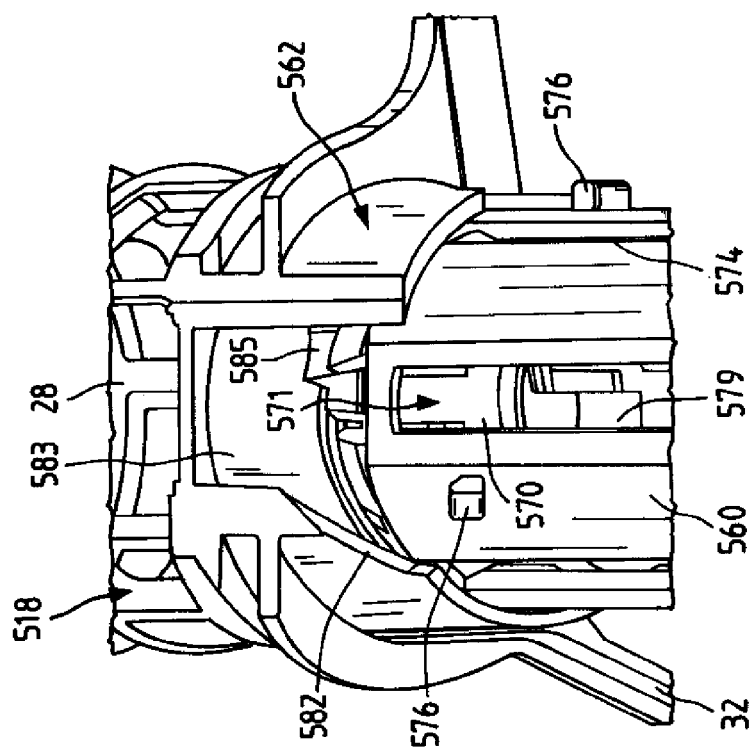
FIG. 22 is a detail view of the switching device of the oil filter of FIG. 16 in the first assembly state.

The release sleeve 583 includes at its free end face three indentations 585 which interrupt the edge of the release sleeve 583 in circumferential direction at uniform spacings. The indentations 585 extend in axial direction. The sides of the indentations 585 that are positioned to the rear when viewed in axial direction from the edge of the release sleeve 583 pass in each case into a slant located at the radial inner circumferential side of the release sleeve 583. The indentations 585 are so arranged in circumferential direction with regard to the guide surfaces 582 of the switching guide 578 of the switching sleeve 562 that the engaged locking spring hooks 571, in the final assembled state as shown in FIG. 23, are immersed in the indentations 585 and thereby can relax. In this manner, the mechanical load of the locking spring hooks 571 is reduced and their life span is increased.

The switching guide 578 with the progressing switching teeth 580 is realized in the form of penetrations in the switching sleeve 562.

Within the release sleeve 583 there is a coaxial stop cylinder 587 and, in axial direction, the release sleeve 583 projects past it. Upon inserting the telescopic switching element 560 into the switching sleeve 562, the dipping cylinder 570 with his closed end face hits the stop cylinder 587 and presses thus the dipping cylinder 570 in the stationary cylinder 564.

The activation and deactivation of the detent connection 20, which includes the detent wings 32 and the detent guide 36, by means of the switching device 558 functions in analogy to the above explained embodiments.

In all of the above described embodiments of an oil filter 10, a filter element 18; 518, and a filter cup 14; 514, the following modifications are possible inter alia:

The invention is not limited to oil filters 10 of internal combustion engines in motor vehicles. Rather, it can be also used in different filters, for example, fuel filters or air filters, of internal combustion engines, industrial engines or compressors. A filter according to the invention can also be used in other technical fields of application.

The filter medium 22 can be folded or formed differently than in a zigzag shape.

The filter housing 12 can also be comprised of more than two housing parts.

The filter cup 14; 514 can be mounted, instead of being suspended, also at an angle or standing upright from above on the filter head 16. Instead of the filter head 16 a different housing part can be provided for attachment of the filter element 18; 518. Instead of being screwed into or onto the filter head 16, the filter cup 14; 514 can be connected also by means of another rotation and/or insertion connection, for example, a bayonet connection, in a releasable way with the filter head.

Instead of the detent lugs 32, different detent means can be also provided. Suitable detent means can be connected, instead of with the filter element 18; 518, also with the filter cup 14; 514; the detent guide is then appropriately arranged at the filter element 18; 518.

The telescopic switching element 60; 560 or a suitable different switching device can be connected, instead of with the filter cup 14; 514, also with the filter element 18; 118. Accordingly, the switching guide 78 is then arranged at the filter cup 14; 514.

The switching device 58; 518 also can have more or fewer than two or three switching lugs 76; 576.

The switching device can also be arranged on a circumferential side of the filter element and the detent device can be arranged, instead, at the center of the detent end disc of the filter element.

Instead of the spiral compression spring 84; 584, a different elastic element, for example, a leaf spring or an elastic plastic element, can be provided also which is adapted to realize a restoring force.

The filter element 18; 118 can project in the dismantling phase, in which the detent lugs 32; 532 are retained in the retaining areas 42, also more or less than 1 cm past the filter cup 14; 514.

The retaining side 52 of the retaining area 42 and the locked position retaining side 57 of the locking area 40 can also extend within a plane that is perpendicular to the rotation/insertion axis 30; 530.

When the sides that are positioned respectively opposite the locked position retaining side 57 of the locking area 40 and the retaining side 52 of the retaining area 42 extend in a common plane perpendicular to the rotation/insertion axis 30; 35, the translation area 44 can also extend within this plane.

The detent connection and the switching device can also be combined. In particular, the detent connection can be designed in such a way, that the functions of the switching device realized and vice versa.

The locking mechanism 559 for the telescopic switching element 560 and/or the release element 583 can be also designed to match each other in a different way.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter (10) for filtering fluids, comprising:
 a filter housing (12), comprising:
  at least two housing parts (14, 16; 514), and
  a filter element (18; 518) which by means of a releasable detent connection (20) is attached in one of the housing parts that acts as a fastening housing part (14; 14) for the filter element (18; 518);

wherein the detent connection (20) comprises
at least two interacting detent components (32, 36), and one of the detent components (32) is connected with the filter element (18; 518) and one of the detent components (36) with the fastening housing part (14; 514); and
at least one of the detent components comprises
at least one detent means (32) and
one of the detent components (36) includes a recess (38) corresponding with the detent means (32), in which recess the detent means (32) hooks in a bayonet-like manner, and the recess (38) comprises the following areas:
a locking area (40) for receiving the detent means (32) while the housing parts (14, 16; 514) are connected;
a retaining area (42) for receiving the detent means (32) during opening of the filter housing (12);
a translation area (44) for releasing the detent means (32) in the recess (38); and
an insertion/removal area (46) for resistance-free joining and separating of detent means (32) and recess (38);
wherein a switching device (58; 558) comprises
at least two corresponding switching components (60, 78; 560);
wherein one of the switching components (60; 560) is connected with the filter element (18; 518) and
wherein one of the switching components (62; 562) is connected with the fastening housing part (14; 514); and
one of the switching components (60; 560) has at least one switching lug (76; 576) extending radially relative to a rotation/insertion axis (30; 530) of the filter (10); and
one of the switching components (62; 562) comprises
a switching guide (78; 578) for guiding the switching lug (76; 576) such that the switching guide (78; 578), upon an impulse-like relative axial movement of the filter element (18; 518) in a direction toward the fastening housing part (14; 514), guides the switching lug (76; 576) and thereby effects a rotation of the filter element (18; 518) relative to the fastening housing part (14; 114) around the rotation/insertion axis (30; 530) for moving the detent means (32) from the insertion/removal area (46) into the locking area (40) or from the retaining area (42) into the insertion/removal area (46), depending on the position of the detent means (32) in the recess (38) before effecting the axial movement.

2. The filter according to claim 1, wherein the switching guide (78; 578) is embodied as a switching sleeve (62; 562) that in circumferential direction has a succession of progressing switching teeth (80; 580) or angled guide members (182).

3. The filter according to claim 1, wherein the switching device (58; 558) includes at least one elastic element embodied as a spiral compression spring (84; 584) realizing a pre-tension between the fastening housing part (14; 514) and the filter element (18; 518).

4. The filter according to claim 3, wherein one of the switching components has a telescopic switching element (60; 560) comprising
a stationary cylinder (64; 164; 264); and
a dipping cylinder (70; 170; 270), between which the elastic element (84; 584) is acting and which can be pushed into each other, for insertion of the filter element (18; 518) into the fastening housing part (14; 514), with realization of a pre-tension of the elastic element (84; 584).

5. The filter according to claim 4, wherein the telescopic switching element (560) comprises
a releasable locking mechanism (559) which is activated in a basic state and blocks pushing together the telescopic switching element (560); and
the other switching component (562) comprises
at least one release element (583) which is adapted to the locking mechanism (559) such that the release element (583) deactivates the locking mechanism (559) when joining the telescopic switching element (560) and the other switching component (562).

6. The filter according to claim 5, wherein at an end face of the filter element (18) a ring seal (86; 186) is fastened sealing relative to the filter housing (12) and is moveable relative to the filter element (18) in axial direction relative to the rotation/insertion axis (30).

7. A filter element, comprising:
a detent component (32) that is adapted to form a releasable detent connection (20) with a detent component (36), which is connected with a fastening housing part (14) of a filter housing (12);
wherein one of the detent components comprises
at least one detent means (32); and
one of the detent components (36) includes a recess (38) corresponding with the detent means (32), in which recess the detent means (32) hooks in a bayonet-like manner;
wherein the filter element (18; 518) comprises
a switching component (62; 562) that is adapted to interact with a switching component (60; 560) of the fastening housing part (14; 514) such that a switching device (58; 558) embodied with the switching components (60, 62; 562, 562) upon an impulse-like relative axial movement of the filter element (18; 518) in a direction toward the fastening housing part (14; 514) effects a rotation of the filter element (18; 518) relative to the fastening housing part (14; 514) around the rotation/insertion axis (30; 530) of the filter (10) for moving the detent means (32) in the recess (38), depending on the position of the detent means (32) in the recess (38) before effecting the axial movement.

8. The filter element according to claim 7, wherein a ring seal (86; 186) is arranged on an end face of the filter element (18) for sealing relative to the filter housing (12), which ring seal is moveable axially relative to the filter element (18).

9. The filter element according to claim 8, wherein the filter element includes at least one release element (583) which is adapted to deactivate a releasable locking mechanism (559) of a telescopic switching element (560) of the switching device (558) upon installation of the filter element (518) into the fastening housing part (514).

10. A fastening housing part (14; 514) of a filter housing (12) of a filter (10), comprising:
a detent component (36) which, with a detent component (32), which is adapted, connected with a filter element (18; 518) of the filter (10), to form a releasable detent connection (20);
wherein at least one of the detent components comprises
at least one detent means (32) and
one the detent components (36) includes a recess corresponding with the detent means (32), in which recess the detent means (32) hooks in a bayonet-like manner;

wherein the fastening housing part (14; 514) comprises
a switching component (62; 562) includes at least one switching lug (76; 576) adapted to be guided within a switching guide (78; 578) and adapted to interact with a switching component (60; 560) of the filter element (18; 518) such that a switching device (58; 558) embodied of the switching components (60, 62; 560, 562), upon an impulse-like relative axial movement of the filter element (18; 518) in a direction toward the fastening housing part (14; 514), causes a rotation of the filter element (18; 518) relative to the fastening housing part (14; 514) around a rotation/insertion axis (30; 530) of the filter (10) for moving the detent means (32) in the recess (38), depending on the position of the detent means (32) in the recess (38) before effecting the axial movement.

11. A telescopic switching element (60; 560) of a switching device (58; 558) of a releasable detent connection (20) fastening a filter element (18; 518) in a fastening housing part (14; 514) of a filter (10) for filtering fluids, wherein
the telescopic switching element (60; 560) is adapted to be connected with the filter element or with the fastening housing part (14; 514); and
wherein the telescopic switching element (60; 560) has a hollow stationary cylinder (64; 564) and a coaxial dipping cylinder (70; 570), the hollow stationary cylinder (64; 564) is open on one end face, and with the dipping cylinder (70; 570) arranged within the hollow stationary cylinder (64; 564) coaxially and axially movable, and that the telescope element (60; 560) has at least one switching lug (76; 576) that extends radially relative to the rotation/Insertion axis (30; 530) of the filter (10) and is adapted to be guided within a switching guide (78; 578), appropriately connected with the fastening housing part or with the filter element (18; 518), such that the switching guide (78; 578), upon an impulse-like relative axial movement of the filter element (18; 518) in a direction toward the fastening housing part (14; 514), guides the switching lug (76; 576) and thereby causes a rotation of the filter element (18; 518) relative to the fastening housing part (14; 514) around the rotation/insertion axis (30; 530) for actuating the detent connection (20).

12. The telescope switching element according to claim 11, wherein
the telescope switching element comprises a releasable locking mechanism (559) which is activated in a basic state and blocks pushing together the telescopic switching element (560), and which is matched to a release element (583), which accordingly is connected with the fastening housing part or with the filter element (518), such that the release element (583) upon installation of the filter element (518) in the fastening housing part (514) deactivates the locking mechanism (559).

* * * * *